(12) United States Patent
Gatayama

(10) Patent No.: US 12,440,176 B2
(45) Date of Patent: Oct. 14, 2025

(54) MEDICAL IMAGE DIAGNOSTIC APPARATUS, MEDICAL IMAGE DIAGNOSTIC SYSTEM, AND INFORMATION PROCESSING METHOD OF MEDICAL IMAGE DIAGNOSIS

(71) Applicant: CANON MEDICAL SYSTEMS CORPORATION, Otawara (JP)

(72) Inventor: Kazuki Gatayama, Otawara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 204 days.

(21) Appl. No.: 18/474,593

(22) Filed: Sep. 26, 2023

(65) Prior Publication Data

US 2024/0099669 A1   Mar. 28, 2024

(30) Foreign Application Priority Data

Sep. 27, 2022   (JP) .................................. 2022-154012

(51) Int. Cl.
  *A61B 6/03*   (2006.01)
  *A61B 6/00*   (2006.01)
  *A61B 6/46*   (2024.01)

(52) U.S. Cl.
  CPC .............. *A61B 6/032* (2013.01); *A61B 6/465* (2013.01); *A61B 6/481* (2013.01)

(58) Field of Classification Search
  CPC ......... A61B 6/032; A61B 6/465; A61B 6/481; A61B 6/545; A61B 6/467; A61B 6/469; A61B 6/488; A61B 6/54
  See application file for complete search history.

(56) References Cited

U.S. PATENT DOCUMENTS

2013/0259189 A1* 10/2013 Sakai ...................... A61B 6/54
                                                              378/4
2022/0022837 A1*  1/2022 Li .......................... G16H 30/20

FOREIGN PATENT DOCUMENTS

WO    WO 2020/090013 A1    5/2020

* cited by examiner

*Primary Examiner* — Kiho Kim
(74) *Attorney, Agent, or Firm* — Oblon, McClelland, Maier & Neustadt, L.L.P.

(57) ABSTRACT

A medical image diagnostic apparatus according to an embodiment includes at least one processor. The at least one processor is configured to set, in a case where a plurality of scan processes corresponding to respective and independent imaging techniques are sequentially performed, reference time that acts as a reference for a start timing of at least one of second and subsequent scan processes from among the plurality of scan processes, and use the reference time that has been set, and sequentially performs the plurality of scan processes in response to an instruction received from a user.

14 Claims, 12 Drawing Sheets

MEDICAL IMAGE DIAGNOSTIC APPARATUS, MEDICAL IMAGE DIAGNOSTIC SYSTEM, AND INFORMATION PROCESSING METHOD OF MEDICAL IMAGE DIAGNOSIS

CROSS-REFERENCE TO RELATED APPLICATIONS

This application is based upon and claims the benefit of priority from Japanese Patent Application No. 2022-154012, filed on Sep. 27, 2022; the entire contents of which are incorporated herein by reference.

FIELD

Embodiments described herein relate generally to a medical image diagnostic apparatus, a medical image diagnostic system, and an information processing method of a medical image diagnosis.

BACKGROUND

Conventionally, in medical image diagnostic apparatuses, in some cases, an imaging protocol of an examination is selected from a list that includes imaging protocols and that has been generated in advance. Each of the imaging protocols included in the list is generated in advance on the basis of, for example, regulations in a hospital, a radiation dose guideline, and the like, as a general-purpose imaging protocol with respect to a specific examination.

For example, in an imaging protocol related to a contrast examination that is performed in a plurality of time phases, the start time or a quiescent time period is set to each of the time phases, and imaging is performed at a timing conforming to the guideline. For example, there is a known technology of setting start time and controlling an imaging timing of each of the time phases by using relative time from the time at which imaging has been started. Imaging performed by setting the start time are in demand because it is easily perform control at the timing conforming to the guideline. However, regarding an arbitrary scan from among a plurality of scans that are included in a single imaging protocol, in a case where another scan that acts as a reference of the start time is a monitoring scan, a period of time for which the contrast effect reaches a peak is not considered, and a scan may possibly be performed at a timing that is different from an expected timing.

DETAILED DESCRIPTION

Figure 1:
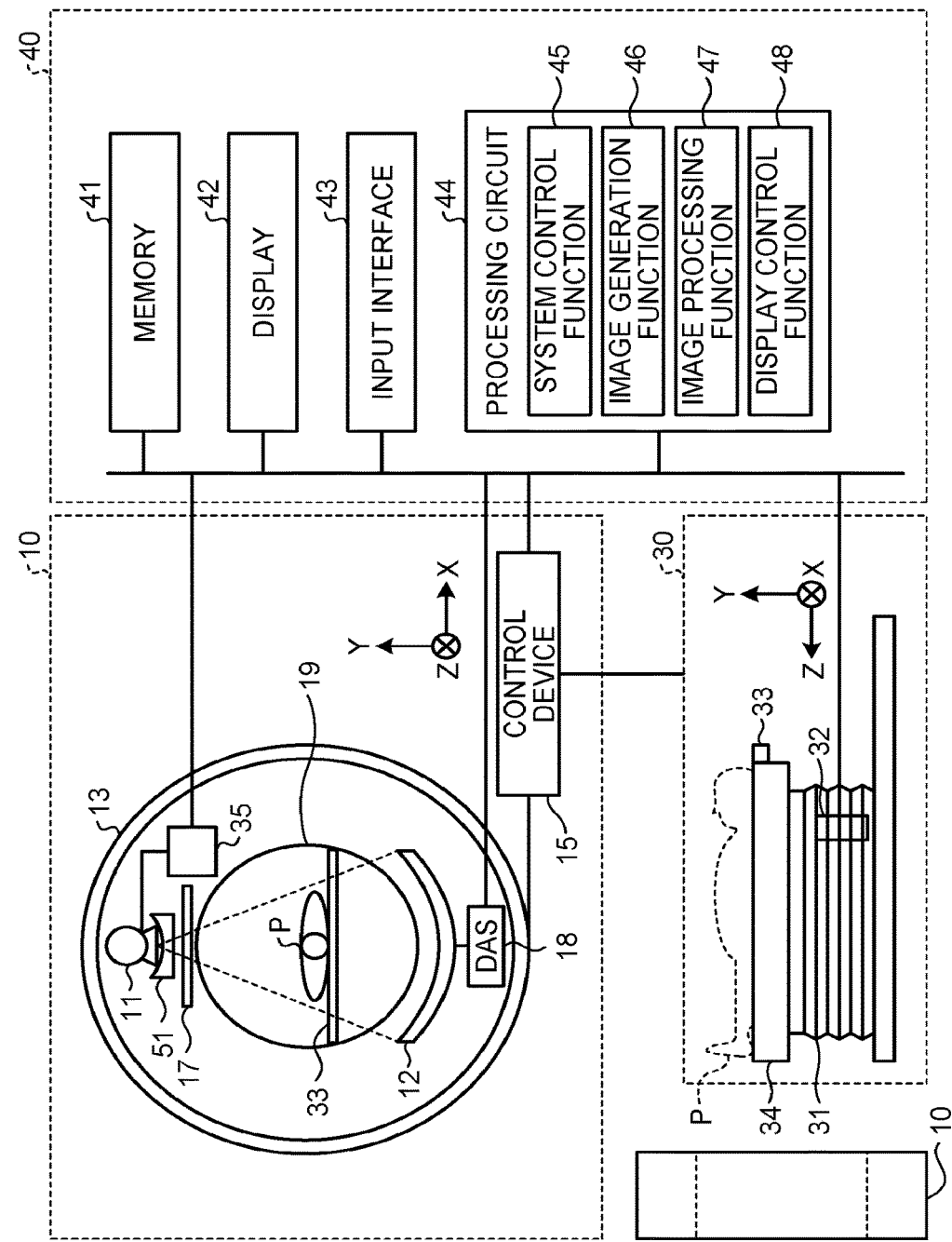
FIG. 1 is a diagram illustrating one example of a configuration of an X-ray computed tomography (CT) apparatus according to an embodiment.

A medical image diagnostic apparatus and an information processing method of medical image diagnosis according to each embodiment will be described below with reference to the drawings. Furthermore, in the following description, components having the same or substantially the same functions as those described with respect to the drawings already illustrated are denoted by the same reference numerals, and redundant description thereof is given only when necessary. In addition, even when the same part is represented, the dimensions and the proportions may sometimes differ from each other depending on the drawing. Moreover, regarding the components having the same or substantially the same functions as those described with respect to the drawings already illustrated, the components are sometimes distinguished by adding "a", "b", "c" or "d" at the end of the associated components. Furthermore, for example, from a viewpoint of ensuring visibility of the drawings, reference numerals are attached only to the main components in the description of each of the drawings, and, even if the components have the same or substantially the same functions as those described with respect to the drawings already described, in some cases, reference numerals are not attached to these components.

The present embodiment exemplifies an X-ray computed tomography (CT) apparatus as a medical image diagnostic apparatus that implements an information processing method of medical image diagnosis. FIG. 1 is a diagram illustrating one example of a configuration of an X-ray CT apparatus 1 according to the embodiment. The X-ray CT apparatus 1 irradiates a subject P with X-rays emitted from an X-ray tube 11, and detects the irradiated X-rays by an X-ray detector 12. The X-ray CT apparatus 1 generates CT image (medial image) data related to the subject P on the basis of an output from the X-ray detector 12.

As illustrated in FIG. 1, the X-ray CT apparatus 1 includes a gantry 10, a table 30, and a console 40. Furthermore, in FIG. 1, for convenience of description, the plurality of gantries 10 are illustrated. The gantry 10 is a scanning device that has a structure for performing an X-ray CT imaging process on the subject P. The table 30 is a conveying device on which the subject P targeted for the X-ray CT imaging process is placed and that is used for positioning the subject P. The console 40 is a computer that controls the gantry 10. For example, the gantry 10 and the table 30 are installed in a CT examination room, whereas the console 40 is installed in a control room located adjacent to the CT examination room. The gantry 10, the table 30, and the console 40 are connected in a wired or wireless manner so as to be able to communicate each other. Here, the gantry 10 and the table 30 are one example of an imaging unit.

Furthermore, the console 40 need not always be installed in the control room. For example, the console 40 may be installed in the same room together with the gantry 10 and the table 30. In addition, the console 40 may be incorporated in the gantry 10.

Furthermore, in the present embodiment, a rotation axis of a rotatable frame 13 in a non-tilted state or the longitudinal direction of a table top 33 of the table 30 is defined as a Z-axis direction, the axial direction that is orthogonal to the Z-axis direction and that is parallel to a floor surface is defined as an X-axis direction, and the axial direction that is orthogonal to the Z-axis direction and that is perpendicular to the floor surface is defined as a Y-axis direction.

Here, the X-ray CT apparatus 1 is connected to other devices that are installed in, for example, a hospital by using an in-hospital local area network (LAN), and is able to be directly or indirectly communicated each other. For example, the X-ray CT apparatus 1 is connected to a picture archiving and communication system (PACS) server that stores therein medial images and that is used to process the medial images, another medical image diagnostic apparatus, a terminal device in which a doctor in charge refers to images, and the like. Each of the apparatuses and the devices sends and receives the medial image, and the like in a manner conforming to, for example, the digital imaging and communications in medicine (DICOM) standard.

Furthermore, in the system that includes each of the apparatuses and the devices described above, a hospital information system (HIS), a radiology information system (RIS), and the like are installed, and various kinds of information are managed. For example, an examination order that has been generated by the terminal device included in the system described above is transmitted to each of the medical image diagnostic apparatuses and the like. Each of the medical image diagnostic apparatuses acquires the examination order that has been directly received from the terminal device, or acquires patient information from a patient list (modality work list) for each modality that has been generated by the PACS server that receives the examination order.

As illustrated in FIG. 1, the gantry 10 includes the X-ray tube 11, the X-ray detector 12, the rotatable frame 13, an X-ray high voltage device 14, a control device 15, a wedge 16, a collimator 17, and a data acquisition circuit (data acquisition system (DAS)) 18.

The X-ray tube 11 is a vacuum tube that includes a cathode (filament) that generates a thermal electron and an anode (target) that generates an X-ray in response to a collision with the thermal electron. The X-ray tube 11 uses a high voltage supplied from the X-ray high voltage device 14 and irradiates X-rays with the subject P by allowing the thermal electron to be emitted from the cathode toward the anode. Here, the X-ray tube 11 is one example of an X-ray generating unit. By switching the voltage supplied by the X-ray high voltage device 14, for each of a predetermined number of views, during a time period for which the X-rays are irradiated, it is possible to implement so-called dual energy CT imaging. Furthermore, in the embodiment, the X-ray CT apparatus 1 that is able to implement the dual energy CT imaging need not always be used, but the X-ray CT apparatus 1 that is able to implement only ordinary single energy CT imaging may be used. In addition, the X-ray CT apparatus 1 is not limited to the dual energy CT imaging, but it may be possible to use the X-ray CT apparatus 1 that is able to implement multi energy CT imaging that performs data processing on energies having three types or more.

The X-ray detector 12 detects the X-rays that have been emitted from the X-ray tube 11 and that have passed through the subject P, and outputs an electrical signal corresponding to an amount of radiation dose of the detected X-ray to the DAS 18. The X-ray detector 12 includes, for example, arrays of X-ray detection elements constituted such that a plurality of X-ray detection elements are arrayed in a channel direction along an arc centered on the focal point of the X-ray tube 11. The X-ray detector 12 has a structure in which, for example, a plurality of arrays of the plurality of X-ray detection elements in the channel direction are arranged in a slice direction (a column direction and a row direction). Here, the X-ray detector 12 is one example of an X-ray detection unit.

Furthermore, the X-ray detector 12 is a detector of an indirect conversion type including, for example, a grid, a scintillator array, and an optical sensor array. The scintillator array includes a plurality of scintillators. Each of the scintillators includes a scintillator crystal that outputs light in an amount of light corresponding to the amount of incident X-rays. The grid is arranged on a surface of the scintillator array on the X-ray incident plane side and includes an X-ray shielding plate having a function of absorbing the scattered X-rays. Moreover, the grid is sometimes referred to as a collimator (a one-dimensional collimator or a two-dimensional collimator). The optical sensor array has a function of converting the light from the scintillators to an electrical signal corresponding to the amount of light. As the optical sensor, for example, a photomultiplier tube (PMT), or the like is used.

Moreover, the X-ray detector 12 may be a detector of a direct conversion type including a semiconductor device that converts incident X-rays to electrical signals.

The rotatable frame 13 is an annular frame that is constituted to support the X-ray tube 11 and the X-ray detector 12 so as to face each other and to cause the X-ray tube 11 and the X-ray detector 12 to rotate by using the control device 15 that will be described later. At an opening section 19 of the rotatable frame 13, an image field of view (FOV) is set. For example, the rotatable frame 13 is cast by using aluminum as a material. Moreover, in addition to the X-ray tube 11 and the X-ray detector 12, the rotatable frame 13 is able to further support the X-ray high voltage device 14, the wedge 16, the collimator 17, the DAS 18, and the like. In addition, the rotatable frame 13 is able to further support various components that are not illustrated in FIG. 1. Here, the rotatable frame 13 is one example of a rotating part.

The X-ray high voltage device 14 includes a high voltage generating device and an X-ray control device. The high voltage generating device includes an electric circuit, such as a transformer or a rectifier, and generates a high voltage that is applied to the X-ray tube 11 and a filament current that is supplied to the X-ray tube 11. The X-ray control device performs control of an output voltage in accordance with the X-rays irradiated by the X-ray tube 11. The high voltage generating device may be of a transformer type or an inverter type. The X-ray high voltage device 14 may be provided on the rotatable frame 13 included in the gantry 10, or may be provided on a fixed frame (not illustrated) included in the gantry 10. In addition, the fixed frame is a frame that rotatably supports the rotatable frame 13. Here, the X-ray high voltage device 14 is one example of an X-ray high voltage unit.

The control device 15 includes a driving mechanism, such as a motor and an actuator, and a processing circuit that includes a processor that controls the driving mechanism, a memory, and the like. The control device 15 performs operation control of the gantry 10 and the table 30 in response to an input signal received from an input interface 43 that is provided in the gantry 10, and the like. For example, the control device 15 performs, in response to the input signal, control to rotate the rotatable frame 13, control to tilt the gantry 10, and control to operate the table 30.

Furthermore, the control to tilt the gantry 10 is implemented as a result of the control device 15 rotating the rotatable frame 13 about an axis parallel to the X-axis direction on the basis of information on an inclination angle (tilt angle) that is input by the input interface provided in the gantry 10. In addition, the control device 15 may be provided in the gantry 10, or may be provided in the console 40.

The wedge 16 is a filter for adjusting an amount of the X-rays emitted from the X-ray tube 11. Specifically, the wedge 16 is a filter that allows the X-rays emitted from the X-ray tube 11 to pass and to be attenuated such that the X-rays that has been emitted from the X-ray tube 11 and that is irradiated on the subject P has a predetermined distribution. For example, the wedge 16 is a wedge filter or a bow-tie filter, and is constituted by processing aluminum or the like so as to have a predetermined target angle and a predetermined thickness.

The collimator 17 limits a radiation range of the X-ray that have passed through the wedge 16. The collimator 17 supports, in a slidable manner, a plurality of lead plates that blocks the X-rays, and adjust the shapes of slits that are formed by the plurality of lead plates. In addition, the collimator 17 is sometimes referred to as an X-ray limiter.

The DAS 18 reads, from the X-ray detector 12, the electrical signal corresponding to the amount of radiation dose of the X-rays that have been detected by the X-ray detector 12. The DAS 18 amplifies the read electrical signal and collects, by integrating (adding) the electrical signals over a view time period, detection data that has a digital value corresponding to the amount of radiation dose of the X-rays over the view time period. The detection data is referred to as projection data. The DAS 18 is implemented by using an application specific integrated circuit (ASIC) having mounted thereon a circuit element capable of generating, for example, the projection data. The projection data is transmitted to the console 40 via a non-contact data transmission device, or the like. Here, the DAS 18 is one example of a data acquisition unit.

Furthermore, the detection data that has been generated by the DAS 18 is transmitted, by using optical communication, from a transmitter that is provided on the rotatable frame 13 and that includes a light emitting diode (LED) to a receiver that is provided in a non-rotating portion (for example, the fixed frame that is not illustrated in FIG. 1) of the gantry 10 and that includes a photodiode, and is then transferred to the console 40. In addition, the method of transmitting the detection data from the rotatable frame 13 to the non-rotating portion of the gantry 10 is not limited to the optical communication. It may be possible to use any data transmission method with a non-contact type, or it may be possible to use a data transmission method with a contact type.

The table 30 is a device on which the subject P to be scanned is placed and moved, and includes a base 31, a table driving device 32, the table top 33, and a supporting frame 34. The base 31 is a casing that supports the supporting frame 34 so as to be movable in a vertical direction. The table driving device 32 is a driving mechanism that moves the table top 33 in a longitudinal direction (Z-axis direction) of the table top 33, and includes a motor, an actuator, and the like. The table top 33 is a board on which the subject P is placed. The table top 33 is provided on the top surface of the supporting frame 34. The table top 33 is capable of projecting from the table 30 toward the gantry 10 side such that imaging of the entire body of the subject P is able to be performed. The table top 33 is made of, for example, carbon fiber reinforced plastic (CFRP) that exhibits favorable transparency of the X-rays and physical properties of rigidity and strength. In addition, for example, the interior portion of the table top 33 is hollow. The supporting frame 34 supports the table top 33 so as to be movable in the longitudinal direction of the table top 33. Here, the table 30 is one example of a medical table apparatus.

The console 40 includes a memory 41, a display 42, the input interface 43, and a processing circuit 44. Data communication among the memory 41, the display 42, the input interface 43, and the processing circuit 44 is performed via a bus. In the following, the console 40 is described as a separate device from the gantry 10, but the gantry 10 may include the console 40 or some of the components of the console 40.

The memory 41 is implemented by, for example, using a semiconductor memory device, such as a random access memory (RAM) or a flash memory, or using a hard disk, an optical disk, or the like. For example, the memory 41 stores therein the projection data and reconstruction image data. Furthermore, the memory 41 stores therein, for example, an imaging protocol in accordance with a region and a purpose of an examination. Moreover, for example, the memory 41 stores therein various types of programs. In addition, the storage area of the memory 41 may be included in the X-ray CT apparatus 1, or may be included in an external storage device that is connected by a network. Here, the memory 41 is one example of a storage unit.

Here, the imaging protocol is defined on the basis of a certain purpose and is used to define a scan order of a series of scans of CT imaging including at least one or more of scans and various conditions. In other words, if an imaging protocol has been determined, a plurality of imaging techniques that are included in the determined imaging protocol and the order of the plurality of imaging techniques are determined. In a description below, the imaging protocol is sometimes referred to as a scanning plan. Furthermore, in some cases, the imaging protocol is simply referred to as a protocol. In the present embodiment, a description will be made with the assumption that a single imaging protocol is a series of scans that are performed by a single exposure instruction.

The display 42 displays various kinds of information. The display 42 outputs, for example, a medial image (CT image) that has been generated by the processing circuit 44, a graphical user interface (GUI) that is used to receive various operations from an operator, and the like. The GUI that is used to receive the various operations from the operator includes various operation screens that is related to setting of a start time reference related to each of a plurality of scans that are included in the imaging protocol. In a description below, editing of an imaging protocol is sometimes referred to as protocol editing. As the display 42, it is possible to use various kinds of arbitrary displays may be used as needed. For example, as the display 42, it is possible to use a liquid crystal display (LCD), a cathode ray tube (CRT) display, an organic electro luminescence (EL) display (OELD), or a plasma display. Here, the display 42 is one example of a display unit.

Furthermore, the display 42 may be provided in any location in the control room. Moreover, the display 42 may be provided in the gantry 10. In addition, the display 42 may be a desktop type, or may be constituted by a tablet terminal or the like that is able to wirelessly communicate with the main body of the console 40. Furthermore, as the display 42, one or more projectors may be used.

The input interface 43 receives various input operations from the operator, converts the received input operations to electrical signals, and outputs the electrical signals to the processing circuit 44. For example, the input interface 43 receives a collection condition at the time of collecting the projection data, a reconstruction condition at the time of reconstructing the CT image, an image process condition at the time of generating a post-processing image from a CT image, and the like from the operator. The input interface 43 receives various input operations performed on the various operation screens related to, for example, setting of the start time reference from the operator. Here, the input interface 43 is one example of an input unit.

As the input interface 43, it is possible to use, for example, a mouse, a keyboard, a trackball, a switch, a button, a joystick, a touch pad, a touch panel display, or the like, as appropriate. Furthermore, in the present embodiment, the input interface 43 is not limited to these physical operation parts. For example, another example of the input interface 43 includes an electrical signal processing circuit that receives an electrical signal corresponding to an input operation from an external input device that is provided separately from the device, and that outputs the received electrical signal to the processing circuit 44. Furthermore, the input interface 43 may also be provided in the gantry 10. Moreover, the input interface 43 may also be configured as a tablet terminal capable of communicating with the main body of the console 40 in a wireless manner.

The processing circuit 44 controls the overall operation of the X-ray CT apparatus 1. The processing circuit 44 includes, as hardware resources, a processor and a memory, such as a ROM or a RAM. The processing circuit 44 executes a system control function 45, an image generation function 46, an image processing function 47, a display control function 48, and the like by the processor that executes programs loaded into a memory. Here, the processing circuit 44 is one example of a processing unit.

In the system control function 45, the processing circuit 44 controls various functions of the processing circuit 44 on the basis of the input operation that has been received from the operator via the input interface 43. The processing circuit 44 in the system control function 45 is one example of a control unit.

For example, the processing circuit 44 performs, on the basis of the input operation received from the operator via the input interface 43, control of generating, editing, deleting a preset imaging protocol or an examination imaging protocol. For example, the processing circuit 44 performs control of capturing an image of the subject P in accordance with the selection protocol that is displayed in the protocol display area on the scan execution screen (see, for example, FIG. 7).

In the image generation function 46, the processing circuit 44 generates data obtained by performing pre-processing, such as a logarithmic transformation process, an offset correction process, a sensitivity correction process among channels, and beam hardening correction, on the detection data that has been output from the DAS 18. The processing circuit 44 stores the generated data in the memory 41. Furthermore, data (detection data) that is not yet subjected to pre-processing and data that has been subjected to pre-processing are sometimes collectively referred to as the projection data. The processing circuit 44 performs a reconstruction process on the generated projection data (projection data that has been subjected to pre-processing) by using a filtered back projection method, a successive approximation reconstruction method, machine learning, or the like, and then, generates CT image data. The processing circuit 44 stores the generated CT image data in the memory 41.

In the image processing function 47, the processing circuit 44 converts, by using a known method on the basis of an input operation received from the operator via the input interface 43, the CT image data that has been generated by the image generation function 46 to cross-sectional image data on an arbitrary cross-sectional plane or three-dimensional image data. For example, the processing circuit 44 performs a three-dimensional image process, such as volume rendering, surface rendering, an image value projecting process, a multi-planar reconstruction (MPR) process, a curved MPR (CPR) process, on the subject CT image data and generates rendering image data in an arbitrary viewpoint direction. Moreover, the process of generating the three-dimensional image data, such as the rendering image data in the arbitrary viewpoint direction may directly be performed by the image generation function 46. The processing circuit 44 stores the cross-sectional image data and the three-dimensional image data in the memory 41.

Furthermore, in the image processing function 47, the processing circuit 44 generates image data for displaying various display screens related to setting of the start time reference related to a plurality of scans that are included in the imaging protocol. In a description below, setting of the start time reference related to the plurality of scans that are included in the imaging protocol is sometimes referred to as condition setting.

In the display control function 48, the processing circuit 44 causes the display 42 to display an image on the basis of various kinds of image data that have been generated by the image processing function 47. The image to be displayed by the display 42 includes a CT image based on the CT image data, a cross-sectional image based on the cross-sectional image data on an arbitrary cross-sectional plane, a rendering image in an arbitrary viewpoint direction based on the rendering image data in an arbitrary viewpoint direction, and the like. The image to be displayed by the display 42 includes an image for displaying an operation screen, and an image for displaying a notification and an alert with respect to the operator. The operation screen includes various display screens related to a selection of a protocol and setting of the start time reference. Here, the processing circuit 44 that implements the display control function 48 is one example of a setting unit.

In addition, each of the functions 45 to 48 need not always be implemented by a single processing circuit. It may be possible to construct the processing circuit 44 by combining a plurality of independent processors and implement each of the functions 45 to 48 by causing each of the processors to execute the corresponding programs. Here, each of the functions 45 to 48 may be implemented by a single or a plurality of processing circuits in a distributed or integrated manner.

Furthermore, it has been explained that the console 40 performs the plurality of functions in a single console, but different consoles may perform the plurality of functions. For example, the functions, such as the image generation function 46 and the image processing function 47, of the processing circuit 44 may be implemented in a distributed manner.

Furthermore, the processing circuit 44 need not always be included in the console 40, the processing circuit 44 may be included in an integrated server that collectively performs a process on the detection data that has been acquired by a plurality of medical image diagnostic apparatuses.

Furthermore, the post-processing may be performed either in the console 40 or in an external workstation. In addition, the post-processing may be performed in both of the console 40 and the workstation at the same time. As the workstation, it is possible to appropriately use a computer or the like that includes, as hardware resources thereof, a processor that implements, for example, the image generation function 46 and the image processing function 47, and a memory, such as a ROM or a RAM.

Although not illustrated in FIG. 1, in a case where an image is captured by the X-ray CT apparatus 1 while injecting a contrast agent, an injection device for the contrast agent is connected to the processing circuit 44 so as to be able to communicate each other, the image is captured such that an injection timing of the contrast agent injected by the injection device and a timing of capturing of the image obtained by the X-ray CT apparatus 1 are linked.

In addition, at the time of reconstruction of the X-ray CT image data, it is possible to use one of the reconstruction techniques between the full scan reconstruction technique and the half scan reconstruction technique. For example, in the case of the full scan reconstruction technique, the processing circuit 44 uses projection data by an amount corresponding to a full circle around the subject P, that is 360 degrees in a reconstruction process function 444. Furthermore, in the case of half scan reconstruction technique, the processing circuit 44 uses projection data by an amount corresponding to "180 degrees+a fan angle". In the present embodiment, to simplify the explanations, it is assumed that the processing circuit 44 uses the full scan reconstruction technique in which reconstruction is performed by using the projection data by an amount corresponding to the full circle around the subject P, that is, 360 degrees.

In addition, the technology according to the present embodiment is applicable to various types of the X-ray CT apparatus 1, such as a third generation CT apparatus or a fourth generation CT apparatus. Here, the third generation CT apparatus is a Rotate/Rotate-Type in which both of an X-ray tube and a detector rotate around a subject as an integrated unit. The fourth generation CT apparatus is a Stationary/Rotate-Type in which a large number of X-ray detection elements arrayed in a ring shape are fixed and only the X-ray tube rotates around the subject.

Furthermore, the technology according to the present embodiment is applicable to both of an X-ray computed tomography device of a single-X-ray-tube type and an X-ray computed tomography apparatus of a so-called multiple-X-ray-tubes type in which a plurality of pairs each made up of an X-ray tube and a detector are installed on an rotating ring.

In addition, in the present embodiment, the X-ray CT apparatus 1 on which the X-ray detector 12 of an integral type is mounted is described as an example, but the technology according to the present embodiment is able to be implemented as the X-ray CT apparatus 1 on which an X-ray detector of a photon counting type is mounted.

Furthermore, the X-ray CT apparatus 1 according to the present embodiment may be configured as a standing CT. In this case, instead of moving the table top 33, a support unit that is configured to support the subject P in a standing position and that is configured to be movable along a rotation axis of the rotating part of the gantry 10 may be provided, or alternatively, the table top 33 or the table 30 may not be provided. In addition, the X-ray CT apparatus 1 according to the present embodiment may be configured as a movable CT or a dental CT in which the gantry 10 and the table 30 are movable.

Furthermore, in the present embodiment, a case in which the X-ray CT apparatus 1 is used as a medical image diagnostic apparatus will be described; however, the embodiment is not limited to this. The technology according to the embodiment is applicable to another medical image diagnostic apparatus, such as an MRI apparatus, a PET apparatus, a SPECT apparatus, an X-ray diagnostic apparatus, and an ultrasound diagnostic apparatus. In this case, a control circuit of each of the medical image diagnostic apparatuses implements the same function as that of the processing circuit 44 according to the present embodiment.

Furthermore, instead of the case in which various kinds of control related to the condition setting according to the present embodiment are implemented by the console 40 included in the X-ray CT apparatus 1, the various kinds of control related to the condition setting may be implemented by an external workstation or a PACS viewer, or by a combination of the external workstation and the PACS viewer. Alternatively, there may be a case in which the gantry 10 and the table 30 are provided in the X-ray CT apparatus 1, and, regarding the plurality of medical image diagnostic apparatuses including the X-ray CT apparatus 1 provided in the hospital, a common control device implements a part of the function of the above described console 40. In this case, for example, the console 40 includes the input interface 43, and the display 42 that displays a screen or a GUI image received from the control device. An input received from the input interface 43 is transmitted to the control device via the communication network by a communication circuit (not illustrated) that is included in the console 40 and is processed by the control device, a start time reference is set in accordance with the received input, and, in addition, the GUI image that has been updated in accordance with the processed input is output by the communication circuit of the control device, and is then received by the communication circuit of the console 40. In this case, a part of the GUI that will be described later is implemented by the control device. A share of the function of the console 40 and the control device is not limited to this. An update of the GUI image in accordance with the processed input may be performed by the console 40, whereas a change and an update of an imaging condition in accordance with an update of the processed input or the GUI image, and a change and an update of a scanning plan or the protocol information may be performed by the control device. The device that implements display control related to editing of the imaging protocols including setting of the reconstruction condition according to the present embodiment is one example of medical information display control device.

In the following, setting of a start time reference related to an imaging protocol for an examination in image diagnosis performed by using a medical image diagnostic apparatus, such as the X-ray CT apparatus 1 according to the embodiment, will be described in more detail with reference to the drawings.

In image diagnosis performed by using the medical image diagnostic apparatus, such as the X-ray CT apparatus 1, an operator (for example, an engineer in charge, a radiologist, etc.) who operates the medical image diagnostic apparatus determines examination content on the basis of the examination order that has been sent from a doctor in charge, and conducts the examination. At this time, the operator sometimes select an imaging protocol for the examination from a list of the imaging protocols that has been generated in advance. Each of the imaging protocols included in the list is generated in advance as general-purpose imaging protocols for a specific examination on the basis of, for example, the regulations, the radiation dose guideline, and the like determined in the hospital. Here, in the imaging protocol, for example, a scan performed for positioning, a non-contrast scan performed for each region, or a contrast scan performed for each region, and the like are included. In other words, in a case where pieces of X-ray CT image data are collected on the basis of a single imaging protocol, a scan is performed multiple times and the pieces of X-ray CT image data associated with the respective scans are collected.

In image diagnosis performed by using the medical image diagnostic apparatus, such as the X-ray CT apparatus 1, when the operator presets an imaging protocol, generates an imaging protocol in order for an examination before the examination, or edits an imaging protocol at the time of an examination, there may be a case in which the operator sets a start time reference and/or a quiescent time period reference related to each of the plurality of scans that are included in the subject imaging protocol.

For example, in an imaging protocol related to a contrast examination that is performed in a plurality of time phase, the start time or the quiescent time period is set to each of the time phases, and imaging is performed at a timing conforming to the guideline. For example, there is a known technology of setting the start time and controlling an imaging timing of each of the time phases by using the relative time from the time at which imaging has been started. Imaging performed by setting the start time are in demand because of easy-to-control at the timing conforming to the guideline. However, regarding an arbitrary scan that is included in the plurality of scans included in a single imaging protocol, if another scan that acts as the reference of the start time is a monitoring scan, a period of time for which the contrast effect reaches a peak is not considered, a scan may possibly be performed at a timing that is different from an expected timing.

If a scan is performed at a timing that is different from an expected timing, there has been a need to reset the start time or the quiescent time period such that a scan is performed at an intended timing, or there has been a need to perform a scan again.

In addition, if an operation of setting the start time is complicated, it takes much time and effort to generate and edit the imaging protocol. If the start time or the quiescent time period is reset or a scan is performed again, or it takes much time and effort to generate and edit the imaging protocol, a throughput of image diagnosis performed by using the medical image diagnostic apparatus decreases.

In the present embodiment, as will be described below, a medical image diagnostic apparatus capable of visually setting a reference position of the start time is disclosed. In other words, in the present embodiment, the medical image diagnostic apparatus capable of allowing an arbitrary scan process from among a plurality of scan processes that are included in an imaging sequence to be performed at an intended timing is disclosed. Performing an arbitrary scan process from among a plurality of scan processes that are included in an imaging sequence at an intended timing contributes to improvement of the throughput of the image diagnosis.

In the following, the display screen that is displayed on the display by the processing circuit 44 will be described with reference to FIG. 2 to FIG. 15. The display screen is a screen for setting a condition for an examination and the like by, for example, a user, and is able to be operated in accordance with an input received from the input interface 43. The content displayed on the screen is associated with the information on the examination, the content displayed on the screen is changed in accordance with an operation input performed by the user, setting of an input, a change, an addition, a deletion, or the like is appropriately performed in association with the subject change.

FIG. 2 to FIG. 5 are diagrams illustrating one example (1) to (4), respectively, of a protocol generation screen 170 that is displayed on the display 42 according to the embodiment.

The protocol generation screen 170 is an operation screen that is used for presetting the imaging protocol. More specifically, on a protocol generation screen 110 after information (patient information) on the subject P has been registered, the protocol generation screen 170 is an operation screen that is used for generating or modifying the target imaging protocol that is selected as the selection protocol to be performed on the subject P.

Figure 2:
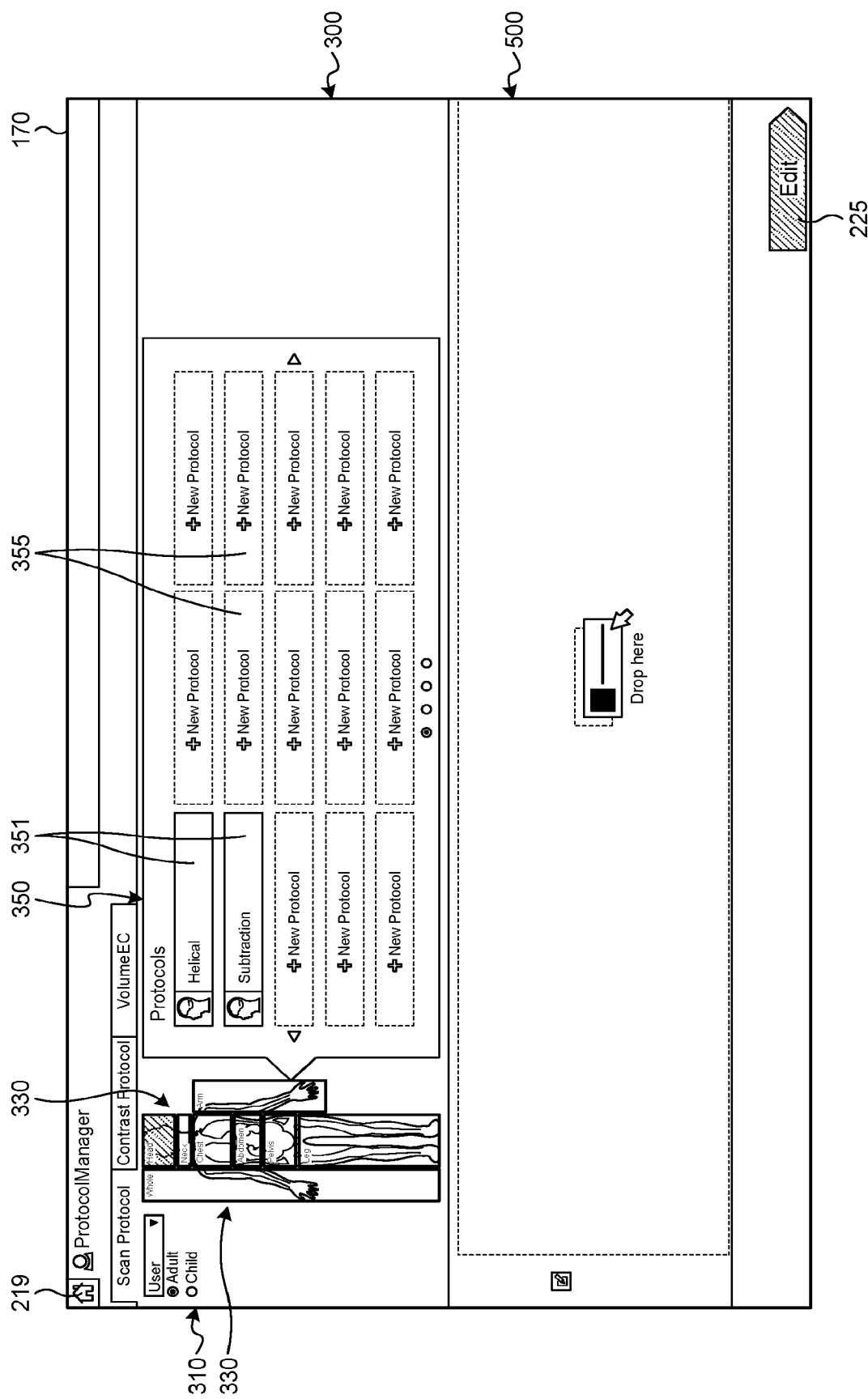
FIG. 2 is a diagram illustrating one example (1) of a protocol generation screen that is displayed on a display according to the embodiment.
Figure 3:
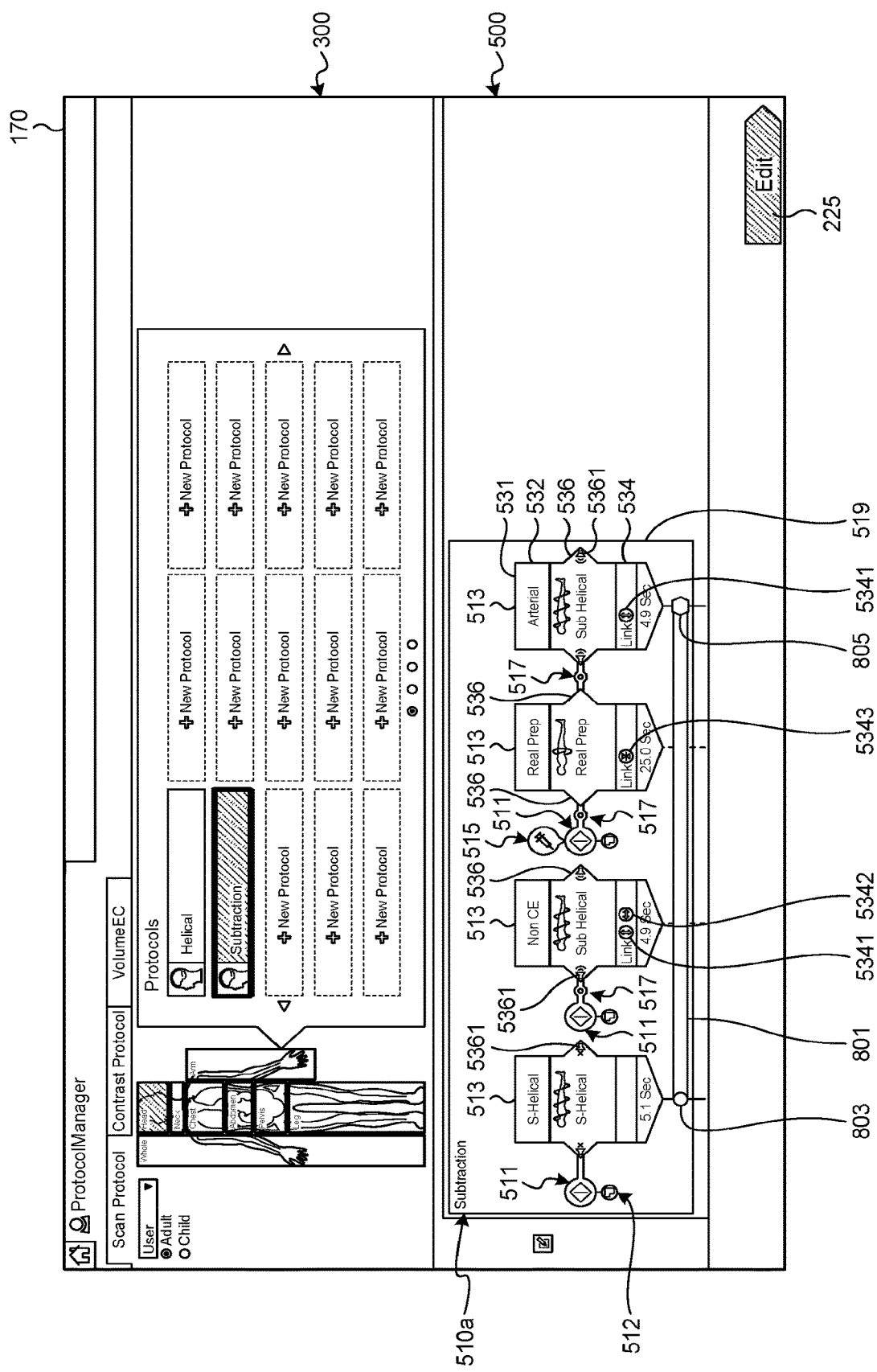
FIG. 3 is a diagram illustrating one example (2) of the protocol generation screen that is displayed on the display according to the embodiment.
Figure 4:
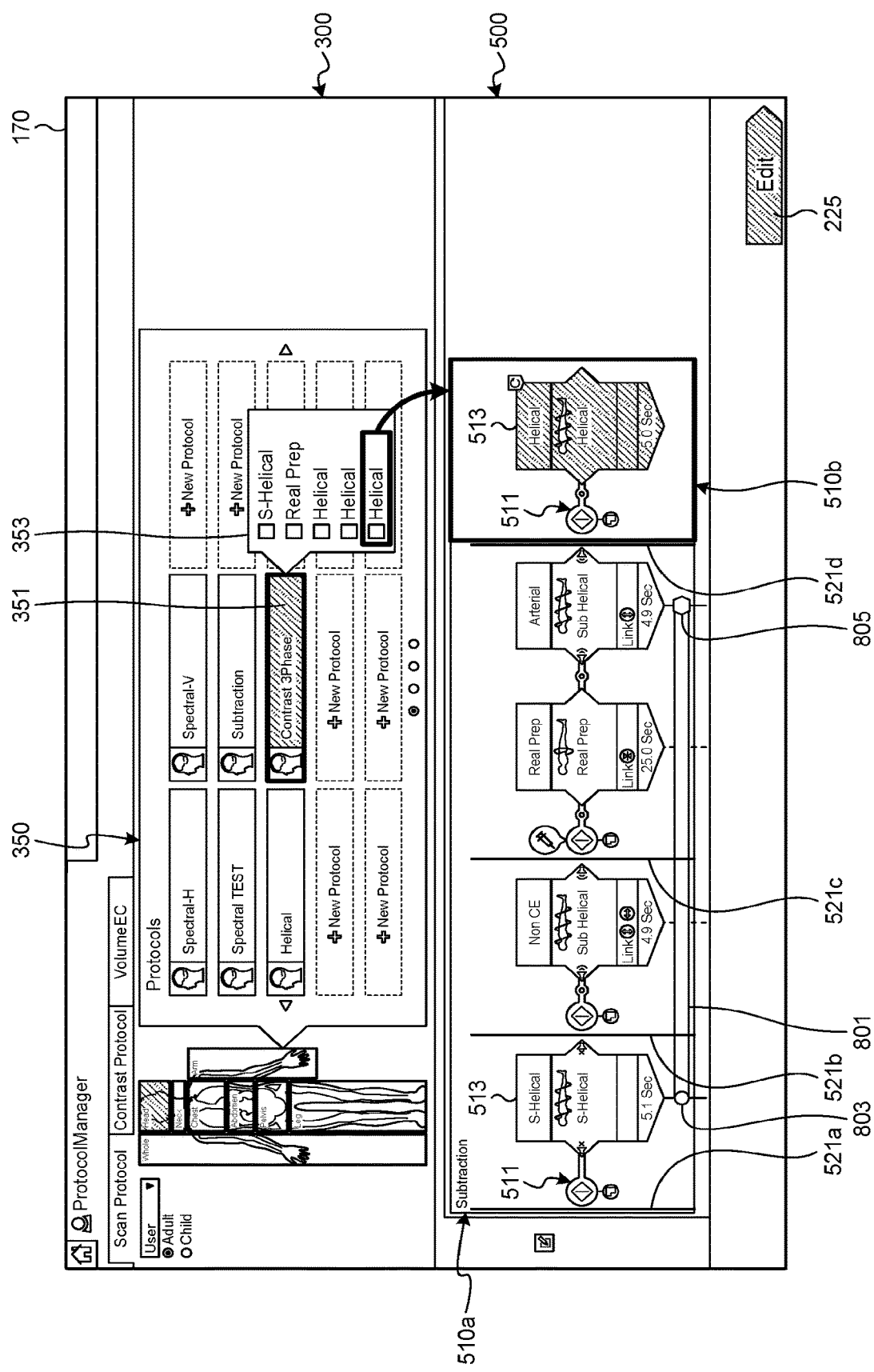
FIG. 4 is a diagram illustrating one example (3) of the protocol generation screen that is displayed on the display according to the embodiment.

FIG. 2 illustrates an example of the initial state of the protocol generation screen 170. FIG. 3 and FIG. 4 each illustrates an example of a state in which the protocol that is being displayed on the protocol generation screen 170. In the protocol generation screen 170 illustrated in FIG. 2 to FIG. 4, the processing circuit 44 displays a protocol selection area 300 and a protocol display area 500.

In the protocol selection area 300, the processing circuit 44 displays an attribute selection unit 310 for setting, for example, as illustrated in FIG. 2, a patient attribute, such as "Adult" or "Child". In addition, the processing circuit 44 displays a region selection portion 330 that is used for setting, for example, as illustrated in FIG. 2, an examination region, such as "Whole", "Head", "Neck", "Chest", "Abdomen", "Pelvis", "Leg", "Arm", and the like. Here, the processing circuit 44 highlights the selected patient attribute and the selected examination region, and displays the highlighted items.

In the protocol selection area 300, the processing circuit 44 displays, for example, as illustrated in FIG. 2, in a list display area 350, the list of the plurality of preset imaging protocols that are able to be used in the region selected by the region selection unit 330. In the following description, in some cases, the list of the imaging protocols is simply referred to as a protocol list. In the list display area 350, the processing circuit 44 displays, for example, as illustrated in FIG. 2, an icon 351 corresponding to at least one preset imaging protocol that is effective for the set patient attribute and examination region. The item indicated by "Helical" is the icon 351 that indicates a protocol for performing a normal helical CT scan. The item indicated by "Subtraction" is the icon 351 that indicates a protocol for obtaining a difference image between the images obtained from two scans that are performed before and after an injection of a contrast agent. Furthermore, to simplify the explanation, hereinafter, a display of the imaging protocol as the displayed icon 351 is sometimes simply referred to as "imaging protocol". In addition, the imaging protocol as imaging information corresponding to the icon 351 is sometimes referred to as the icon 351.

Furthermore, in the protocol selection area 300, the processing circuit 44 displays, for example, as illustrated in FIG. 2, icons 355 that indicate new protocols in the list display area 350. The operator selects the icon 355 that indicates, for example, a new protocol, and starts to generate a protocol. At this time, in response to a selection of the icon 355 that indicates the new protocol selected by the operator, the processing circuit 44 identifies a position as a display position of the icon 351 of the generated imaging protocol after the imaging protocol has been generated by, for example, the subsequent process.

As one example, after the operator has selected, on the protocol generation screen 170, the icon 355 that indicates the new protocol displayed in the list display area 350, the operator is able to display, on the protocol display area 500 by using a drag-and-drop operation, the icon 351 of the imaging protocol that indicates the imaging protocol and that is desired to be selected from among the icons 351 of the plurality of preset imaging protocol. The drag-and-drop operation may be implemented by an operation performed by using a mouse, or may be implemented by an operation performed by using a touch panel.

At this time, the processing circuit 44 displays, on the basis of the input operation received from the operator via the input interface 43, the icon 351 of the imaging protocol that has been selected from the protocol selection area 300 as a display that indicates an active state such that the selected icon 351 is highlighted as compared to the other parts. In addition, the processing circuit 44 displays, in the protocol display area 500, the imaging protocol that indicates the selected icon 351 as an icon 510*a* (an icon 510) of the selection protocol.

Furthermore, an operation performed by the operator to select the icon 351 of an arbitrary imaging protocol from the protocol selection area 300 and to display the selected icon 351 in the protocol display area 500 is not limited to the drag-and-drop operation, but may be implemented by using another operation method. As one example, the operator selects, by a single click on the protocol generation screen 170, the desired icon 351 of the imaging protocol included in the list display area 350 that is displayed in the protocol selection area 300. Then, the operator clicks the protocol display area 500 by a single click in a state in which the icon 351 of the imaging protocol desired to be selected is highlighted. At this time, the processing circuit 44 displays, on the basis of the input operation received from the operator via the input interface 43, the icon 351 of the imaging protocol that has been subjected to the single click and that is included in the protocol selection area 300 as an active state. In addition, when the protocol display area 500 is clicked, detailed information on the icon 351 of the imaging protocol that is in the active state, that is, the icon 510 of the selection protocol, is displayed on the protocol display area 500 that has been clicked.

In the protocol display area 500, the processing circuit 44 displays, for example, as illustrated in FIG. 3, the icon 510 (the icon 510*a*) that indicates the detailed information on the selected imaging protocol. In the following description, the selected imaging protocol is sometimes simply referred to as a selection protocol. The processing circuit 44 displays, information that indicates elements, such as operations and scans performed by the operator, included in the selection protocol, that constitute the imaging protocols as the icon 510 that indicates the detailed information on the selection protocol side by side in time series (in the execution order), for example, as illustrated in FIG. 3, from the left to the right side of the screen.

The processing circuit 44 displays, for example, as illustrated in FIG. 3, regarding the imaging protocol indicated by the icon 351 of "Subtraction", both of a radiation exposure icon 511 that indicates an ON operation of the radiation exposure switch and an icon 515 that indicates an injection of a contrast agent as information that indicates the operations performed by the operator. A start mode icon 512 that is used for setting a start mode is displayed below the radiation exposure icon 511. Setting of the start mode indicates a position at which a scan is able to be started by a radiation exposure switch, and, for example, "control pad", "gantry", or "hand switch" is selected as a position at which the radiation exposure switch to be pressed.

Furthermore, the processing circuit 44 displays, for example, as illustrated in FIG. 3, as the information that indicates the scan included in the selection protocol, a scan icon 513 that indicates each of the imaging of "S-Helical (positioning imaging or helical imaging for scanogram imaging)", "Non CE (helical imaging without performing Contrast Enhancement in which a contrast agent is administered)", "Real Prep (CT fluoroscopic radiography in which a contrast agent is monitored)", "Arterial (imaging is performed in an arterial phase)" included in the imaging protocol that is included in the icon 351 of "Subtraction". In this way, each of the imaging protocols includes at least one scan.

In each of the scan icons 513, information on the subject scan is displayed by a fixed form of characters or image information. For example, in FIG. 3, in a frame 531 formed in substantially a rectangular shape, a name of a scan is displayed in an area 532 that is disposed in an upper part, and a type of the scan is displayed by a character and an icon in an area 533 that is disposed in the lower side of the area 532 in the vicinity of the center. In FIG. 3, in an area 5133, as the type of the scan displayed by the characters and the icon, "S-Helical", "Sub-Helical (helical imaging for subtraction)", "Reap-Prep", or the like are exemplified. In an area 534 disposed in the lower side of the area 533, a character of "Link" indicating that conditions between the scans are synchronized each other and an icon that indicates a type of the conditions to be synchronized are displayed. For example, in the scan icons 513 of "Non-CE", an icon 5341 that indicates the range in the Z direction is to be linked in the scanning range or in the reconstruction range, and an icon 5342 that indicates the size (Field Of View (FOV)) is to be linked in the scanning range or the reconstruction range are displayed. The item indicated by "S-Helical" is scanogram, and is not displayed as "Link", which indicates that setting has been performed such that the imaging condition is not linked. In the frame of the "Arterial" scan, the icon 5341 indicating that link setting of the imaging condition has been performed, that is, the item of "Link" is displayed, and indicating that an imaging range in the Z direction is a link target is displayed. In the item indicated by a "Real Prep" scan, an icon 5343 that indicates a mode in which the subsequent scan (here, an "Arterial" scan) is to be performed in a specific condition that the subsequent scan is able to be started as soon as possible after Prep is displayed next to the "Link" display.

Furthermore, in an area 535 that is disposed in the lowest part, the time taken for the subject scan is displayed.

A protrusion portion 536 having a triangular shape is provided on each of the left side and the right side of the frame 531 that has a substantially rectangular shape, an icon 5361 of a speaker is displayed on the subject position, and presence or absence of an announcement voice is displayed by a type of the icon 5361 at the time of a start of a scan (on the left side) and at the time of an end of the scan (on the right side).

Furthermore, the processing circuit 44 displays, for example, as illustrated in FIG. 3, from among the elements included in the icon 510 of the selection protocol, a connection icon 517 between the elements that are continuously performed. In addition, the processing circuit 44 displays an icon 519 that indicates a range of the subject selection protocol. FIG. 3 exemplifies a rectangular frame as the icon 519. In addition, the icon 519 that indicates the range of the selection protocol may not be displayed.

The scan icon 513, the radiation exposure icon 511, the start mode icon 512, the connection icon 517, and the various icons that are displayed in the frame of the scan icon 513 is able to be changed in accordance with an operation input performed by the user on the subject icon, and various conditions related to the protocols are changed in accordance with the subject operation input. For example, in response to a click of the connection icon 517 of "Real-Prep", and in response to a press of a radiation exposure switch at the time of a start of Non-CE by allowing the "Real-Prep" scan to be displayed by being connected to the "Non-CE" scan (the same display as a connection display between "Real-Prep" and "Arterial"), it is possible to automatically display the connected scans. It is possible to set the start timing of the scan that is subsequently located between the connected scan as elapsed time from the previous event. For example, the start timing of the subsequent scan is set by setting the elapsed time from the timing of each of a press of an irradiation switch, a start of the "Non-CE" scan, an end of the "Non-CE" scan, and the like. This setting is also able to be set in response to an operation input performed by the user with respect to the protocol display area 500.

In the above, the example has been described, with reference to FIG. 2 and FIG. 3, in which it is possible to check the content of the imaging protocol on the protocol generation screen 170 by displaying the icon 510 that indicates a selection protocol by a drag-and-drop operation or the like; however, the example is not limited to this. There may be a case in which the content of the imaging protocol indicated by the icon 351 is displayed by using the following display method.

In the protocol selection area 300, the processing circuit 44 displays a scan list 353, as illustrated in FIG. 4. The scan list 353 indicates the scan that is selected from the list display area 350 by the operator and that is included in the imaging protocol. The processing circuit 44 displays, for example, as illustrated in FIG. 2, the icon that is indicated by the icon 351 of "Contrast 3 Phase" and that indicates one of the scans that are included in the imaging protocol as the scan list 353. In the example illustrated in FIG. 2, the scan list 353 includes the icons that indicate the corresponding scans of "S-Helical", "Real Prep", "Helical", "Helical", and "Helical".

As one example, in the state in which the icon 351 of the imaging protocol that is desired to be selected is highlighted, the operator again clicks the icon 351 of the imaging protocol by a single click. At this time, the processing circuit 44 displays, as a pop-up display, the scan list 353 of the imaging protocol indicated by the clicked icon 351 that is in the active state on the basis of the input operation received from the operator via the input interface 43. Furthermore, similarly to the operation performed with respect to the icon 351 included in the list display area 350, the operator is able to select the scan that is included in the imaging protocol indicated by the icon 351, that is, the scan included in the scan list 353. In addition, the same applies to the process performed by the processing circuit 44.

Furthermore, in the pop-up display of the scan list 353, as illustrated in FIG. 4 as an example, only the scan name may be displayed, or it may be possible to use the same format as that displayed in the protocol display area 500 illustrated in FIG. 2 and FIG. 3.

In this way, the operator is able to allow the scan list 353 to be displayed as a pop-up display by clicking, using a single click twice (double click), the icon 351 of the imaging protocol that is desired to be checked in the list display area 350, so that the operator is able to easily check the imaging protocol by the pop-up display.

Furthermore, in a state in which the detailed information on the protocol is being displayed by the scan list 353, it is possible to further perform an operation, such as an addition, an insertion, a replacement, a deletion of another imaging protocol. Here, a case will be described with reference to FIG. 4 as an example in which the icon 351 of the imaging protocol of "Contrast 3Phase" is further selected on the protocol generation screen 110 illustrated in FIG. 3.

As one example, the operator performs a drag-and-drop operation on the icon 351 of the imaging protocol of "Contrast 3Phase" that is desired to be selected into the protocol display area 500. When the processing circuit 44 detects a start of the drag-and-drop operation related to the icon 351 on the basis of the input operation received from the operator via the input interface 43, the processing circuit 44 displays, in the protocol display area 500, icons 521 (521*a* to 521*d*) each of which indicates the position at which the icon 510 that indicates the detailed information of the imaging protocol is able to be inserted. FIG. 4 illustrates the solid line as the icon 521 as an example. Consequently, when the operator starts the drag-and-drop operation, the operator is able to easily recognize the position at which the icon 510 corresponding to the imaging protocol of "Contrast 3Phase" is able to be inserted.

For example, the operator drops the icon 351 of the imaging protocol of "Contrast 3Phase" into the later area (in FIG. 4, the icon 521*d* and the position on the right side of the icon 521*d*) included in the protocol display area 500. At this time, as illustrated in FIG. 4, the processing circuit 44 adds the icon 510*b* of "Contrast 3Phase" next to (the end of) the icon 510*a* of "Subtraction".

Furthermore, the operator is able to drop the icon 351 of "Contrast 3Phase" into a space 523 that is disposed at the upper part of the protocol display area 500. At this time, the processing circuit 44 replaces the icon 510*a* of "Subtraction" that is being displayed with the icon 510*b* of "Contrast 3Phase".

Furthermore, the operator is also able to drop the icon 510*a* of "Subtraction" that is being displayed in the protocol display area 500 onto the end portion of the protocol generation screen 170 or on top of the list display area 350. At this time, the processing circuit 44 deletes the icon 510*a* of "Subtraction" that is being displayed from the protocol display area 500. In addition, the processing circuit 44 is also able to separately display, on the protocol generation screen 170, the icon that indicates the drop destination that is used to delete the icon 510 of the selection protocol from the protocol display area 500.

Furthermore, in a case where a plurality of imaging protocols are selected in combination, the operator is also able to sort, in units of protocols, the icons 510 of the selection protocols (In FIG. 4, the icons 510*a* and 510*b*) that are being displayed by performing, for example, the drag-and-drop operation in the protocol display area 500. At this time, as described above, when the processing circuit 44 detects the start of the drag-and-drop operation related to the icon 510 disposed in the protocol display area 500 on the basis of the input operation received from the operator via the input interface 43, the processing circuit 44 displays, in the protocol display area 500, the icons 521 (521*a* to 521*d*) each of which indicates the position at which the icon 510 corresponding to the associated imaging protocol is able to be inserted.

In the above, the case has been described as an example, with reference to FIG. 4, in which protocol editing, such as an addition or an insertion of the imaging protocol, a replacement, a move (a sort), or a deletion of the selection protocol, and the like is performed with respect to the protocol display area 500 in units of protocols; however, the example is not limited to this. For example, in the protocol display area 500, it is possible to add and insert a scan that is included in the imaging protocol in units of scans by an operation of drag-and-drop or the like. Similarly, it is also possible to replace, move (sort), and delete the icon of each of the scans included in the icons 510 (510*a* and 510*b*) that are being displayed in the protocol display area 500 in units of scans.

Furthermore, in response to an operation input performed by the operator, the processing circuit 44 may release the connection between the scans that are set to be consecutively performed as indicated by, for example, the connection icon 517 illustrated in FIG. 3 from among the scan icons 513. In this case, the operator is also able to insert a scan into a position of the connection icon 517 either in a units of protocols or in units of scans.

Figure 5:
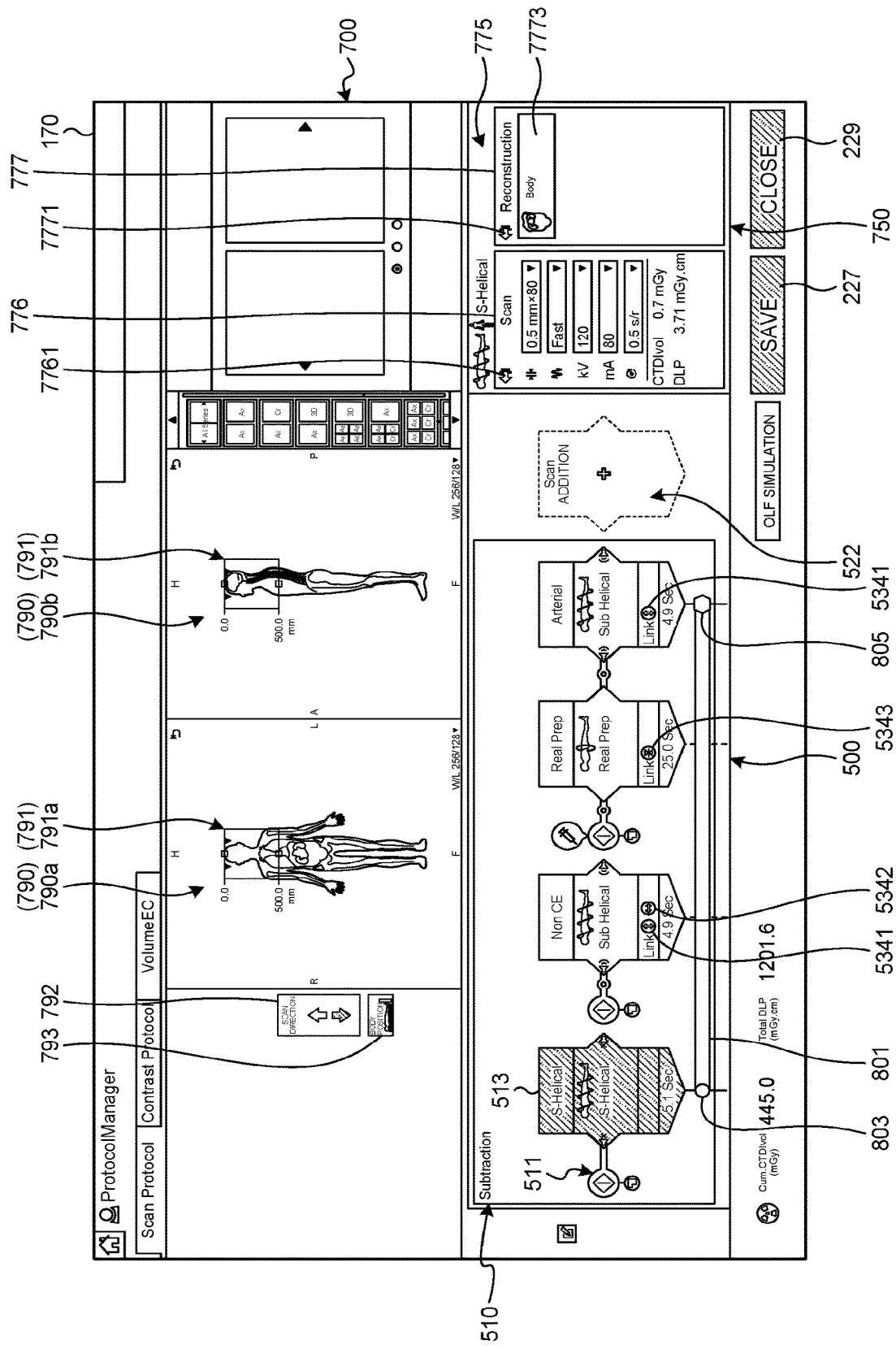
FIG. 5 is a diagram illustrating one example (4) of the protocol generation screen that is displayed on the display according to the embodiment.

On the protocol generation screen 170 illustrated in FIG. 3 and FIG. 4, when an "Edit" button 225 has been selected by the operator, the display screen is transitioned to the protocol generation screen 170 as illustrated in FIG. 5.

FIG. 5 illustrates, as an example, the state in which the protocol displayed on the protocol generation screen 170 has been read. On the protocol generation screen 170 illustrated in FIG. 5, the processing circuit 44 displays the protocol display area 500 and a scan information display area 700.

In response to a selection of the "Edit" button 225 performed by the operator in the state in which the icon 510 of the selection protocol is being displayed in the protocol display area 500, the processing circuit 44 reads, as illustrated in FIG. 5, the selection protocol indicated by the icon 510 that is being displayed in the protocol display area 500.

The operator is able to perform an operation related to protocol editing, such as an addition, an insertion, a replacement, and a deletion, of the icon 351 of the imaging protocol on the protocol generation screen 170 illustrated in FIG. 5. Furthermore, the processing circuit 44 may display the icon 522 that indicates the position at which the scan icon 513 is able to be inserted. In addition, instead of the icon 522, the icon 521 may be displayed. Moreover, the icon 522 may be displayed on the protocol generation screen 170 illustrated in FIG. 3 and FIG. 4.

In an imaging information display area 750, the processing circuit 44 displays, for example, as illustrated in FIG. 5, information indicating scanning ranges 791 (791*a* and 791*b*), information 792 on a scan direction, and information 793 on a body position on a human body image 790, such as a human body model or an image on a subject to be examined. Furthermore, the processing circuit 44 allows a user to make a check by displaying, in the scan information display area 700, an image or the like obtained by scanogram imaging (positioning imaging), setting a scanning range, and displaying the image that is obtained by a scan on a scan execution screen 130, which will be described later, during a scan or after the scan.

Furthermore, the processing circuit 44 displays, for example, as illustrated in FIG. 5, various kinds of information on a scan, such as information 776 on a scan condition and information 777 on a reconstruction condition, in a detailed condition display area 775 included in the imaging information display area 750. In the example illustrated in FIG. 5, the information 776 on the scan condition includes a tab that indicates each of the conditions of a scanning range of "0.5 mm×80", a scanning speed of "Fast", a tube voltage of "120" [kV], a tube current of "80" [mA], and a rotation speed of "0.5 s/r". In addition, in the example illustrated in FIG. 5, the information 776 on the scan condition includes a display of an amount of radiation dose index "computed tomography dose index (CT DI) vol 0.7 mGy" and "dose length product (DLP) 3.71 mGy·cm". Moreover, in the example illustrated in FIG. 5, the information 777 on the reconstruction condition includes an icon that indicates the condition of "Body".

In the following, link setting of a scanning range will be described. In response to an operation input performed by the operator with respect to the area 534 included in each of the scan icons, the processing circuit 44 controls a display/non-display of the character of "Link" indicating that the conditions between the scans is to be synchronized on the protocol generation screen 170 illustrated in, for example, FIG. 3 to FIG. 5. In other words, in response to the operation input performed by the operator, the processing circuit 44 performs link setting of the scanning range that indicates whether or not the scanning ranges are to be linked between the corresponding CT scans.

As one example, the operator performs an operation input for displaying the icon 5341 that indicates that the range in the Z direction is linked to the area 534 included in the scan icon 513 in the state in which at least one of the scan icons 513 has been selected. For example, the processing circuit 44 performs link setting for linking the range in the Z direction included in the scanning range included in the scan condition for the scan that is indicated by one of the scan icons 513 that has been selected by the operator to another scan that is included in the icon 510. At this time, when the scanning range of the other scan included in the icon 510 has been changed, the processing circuit 44 applies the changed scanning range to the scan that has been subjected to the link setting. For example, the processing circuit 44 performs link setting for linking the range in the Z direction included in the scanning range included in the scan condition between at least two scans that have been selected by the operator. At this time, when the scanning range related to the one scan that has been subjected to the link setting has been changed, the processing circuit 44 applies the changed scanning range to the other scan that has been subjected to the link setting.

As one example, the operator performs an operation input for displaying the icon 5342 that indicates that the size (FOV) is allowed to be linked to the area 534 included in the scan icon 513 in the state in which at least one of the scan icons 513 has been selected. For example, the processing circuit 44 performs link setting for allowing the size (FOV) of the scanning range included in the scan condition for the scan indicated by the single scan icon 513 that has been selected by the operator to be linked to the other scan that is included in the icon 510. At this time, when the scanning range of the other scan that is included in the icon 510 has been changed, the processing circuit 44 applies the changed scanning range to the scan that has been subjected to the link setting. For example, the processing circuit 44 performs link setting for allowing the size (FOV) of the scanning range included in the scan condition to be linked between at least two scans that have been selected by the operator. At this time, when the scanning range related to the single scan that has been subjected to the link setting is changed, the processing circuit 44 applies the changed scanning range to the other scan that has been subjected to the link setting.

In the following, a function of adjusting the scanning range 791 according to one embodiment will be described with reference to FIG. 5. For example, in a case where a mouse is included in the input interface 43, a case in which the scanning range is adjusted by using the mouse is assumed. Furthermore, for the human body image 790 that includes a front image 790a and a side image 790b, it may be possible to use a human body model before scanogram imaging is performed, whereas it may be possible to use an image of the subject being examined obtained by the subject scanogram after the scanogram imaging has been performed. In a case where helical imaging or a conventional scan (volume scanning) that is performed without moving the table 30 is performed as scanogram, the processing circuit 44 may generate front image data and side image data from a three-dimensional image that is obtained from the subject scan, and display the front image 790a and the side image 790b on the display 42.

In FIG. 5, an adjustment of the size of the scanning ranges 791a and 791b is mainly performed such that the front image 790a is adjusted with respect to the Z direction and the X direction, and the side image 790b is adjusted with respect to the Z direction and the Y direction. In contrast, when the position of the imaging area is adjusted, it is convenient to allow for movement of the frame that indicates the imaging area in an arbitrary direction. In the state in which the frame indicating the imaging area is being selected, the processing circuit 44 moves the selected frame in the arbitrary direction in accordance with the moving direction of the mouse during a first button operation (for example, a right click) that is performed by the mouse. In contrast, the processing circuit 44 performs display control for moving the selected frame only in a vertical direction of the screen or only in a horizontal direction during a second button operation (for example, a left click) that is performed by the mouse. Such control is performed by extracting a component in the up-and-down directions of a component in the left-and-right directions from the moving direction of the mouse, and moving the frame in accordance with the extracted components.

Selecting the up-and-down directions and the left-and-right directions is performed by selecting the direction in which a movement with a predetermined amount or above is made first time after the start of, for example, the second button operation. For example, in response to the second button operation, a displacement of the up-and-down directions and a displacement of the left-and-right directions are separately accumulated during the subject button operation, and the direction in which an accumulated amount exceeds a predetermined threshold first is selected as the moving direction. In a case where the up-and-down directions has been selected, in a period of time for the subject accumulation, a movement of the frame in accordance with the mouse may be limited (for example, an unmovable state). In a case where the first moving direction (for example, the up-and-down directions) has been selected, the processing circuit 44 moves the subject frame in the first moving direction in accordance with the operation direction of the mouse while limiting the movement of the frame in the second moving direction (left-and-right directions). In a case where the second moving direction has been selected, the processing circuit 44 moves the subject frame in the second moving direction in accordance with the operation direction of the mouse while limiting the movement of the frame in the first moving direction. The processing circuit 44 releases the limitation of the moving direction in accordance with the end of the second button operation. With this control, it is possible to further efficiently adjust the scanning ranges 791a and 791b.

Furthermore, the processing circuit 44 displays, for example, as illustrated in FIG. 5, an icon 7761 that indicates an enlarged display of the scan condition at the time of the display of the information 776 that indicates the scan condition. Similarly, the processing circuit 44 displays, for example, as illustrated in FIG. 5, an icon 7771 that indicates an enlarged display of the reconstruction condition at the time of a display of the information 777 of the reconstruction condition.

On the protocol generation screen 170 illustrated in FIG. 5, when the icon 7771 that indicates the enlarged display of the reconstruction condition has been selected by the operator, the display screen is transitioned to the protocol generation screen 170 in which the detailed condition display area 775 is displayed as an enlarged display.

In response to a selection operation of the icon 7771 that indicates the enlarged display of the reconstruction condition performed by the operator, the processing circuit 44 loads the tab that is used for displaying the information 777 on the reconstruction condition into the detailed condition display area 775.

Furthermore, when the icon 7761 that indicates the enlarged display of the scan condition has been selected by the operator on the protocol generation screen 170 illustrated in FIG. 5, the display screen is transitioned to the protocol generation screen 170 in which the tab for displaying the information 776 on the scan condition has been loaded into the detailed condition display area 775 that has been displayed as an enlarged display.

Furthermore, on the protocol generation screen 170 illustrated in FIG. 3 to FIG. 5, for example, similarly to the link setting of the scanning range as described above, in response to the operation input performed by the operator, the processing circuit 44 may perform link setting of a reconstruction range that indicates whether or not the reconstruction range that is a range of an image reconstruction related to the scan data that is obtained by capturing an image of the subject P is to be linked between the CT scans. Moreover, as the scan condition to be linked, it is also possible to set a reconstruction function and post-processing of a reduction of radiation exposure in a similar manner.

Furthermore, at the time of link setting of the reconstruction range, unlike the link setting of the scanning range, an icon 5343 that indicates a mode, in which the subsequent scan (in the examples illustrated in FIG. 3 to FIG. 5, the "Arterial" scan) is to be performed in a specific condition that the subsequent scan is able to be started as soon as possible after Prep, is not displayed.

When the operator registers a series of selection protocols indicates by the icon 510 that is being displayed in the protocol display area 500 included in the protocol generation screen 170 illustrated in FIG. 5 as a preset of the imaging protocol, the operator selects a "save" button 227. At this time, in response to the selection of the "save" button 227, the processing circuit 44 registers the series of the selection protocols indicated by the icon 510 that is being displayed in the protocol display area 500 as the preset of the imaging protocol that is to be displayed as the icon 351. Furthermore, when the operator ends the operation of generating the protocol, the operator selects a "close" button 229. At this time, the processing circuit 44 ends the display of the protocol generation screen 170 in response to the selection of the "close" button 229.

Furthermore, the case has been described as an example in which the scanning range and the reconstruction range are independently set on the protocol generation screen 170 on which the imaging protocol is preset; however, the example is not limited to this. It is possible to independently set each of the scanning range and the reconstruction range in a similar manner on the protocol editing screen that is the operation screen that is used to select, edit, and adjust the protocol used for the examination and on the scan execution screen 130 (see FIG. 6) that will be described later.

Furthermore, on the protocol editing screen, the protocol display area 500 described above is included. In the protocol display area 500 of the protocol editing screen, the content of the protocol is displayed in the same manner as that displayed on the protocol generation screen 170 described above and the scan execution screen 130 that will be described later. In addition, the protocol editing screen may be referred to as a protocol adjustment screen.

Furthermore, the detailed condition for each of the scans that are included in the imaging protocol is mainly adjusted in the phase next to the protocol editing (protocol adjustment), that is, mainly adjusted on the scan execution screen 130 (see FIG. 6), whereas the protocol editing screen is mainly used to set the overall flow of the protocol, such as a relationship between the scans, a timing at which the irradiation switch is pressed, and an injection timing of a contrast agent. In addition, setting related to the progress of the scan, such as whether or not a voice guidance is needed before and after each of the scans, and the content of the voice guidance, and setting that is less likely to be changed throughout the whole protocol, such as head first or feet first as a body position, are also set on the protocol editing screen. Here, a state of head first as the body position mentioned here indicates a body position by allowing the subject body to enter the gantry 10 from the head side. In contrast, foot first as the body position is a body position by allowing the subject body to enter the gantry 10 from the foot side. In addition, the imaging protocol is mainly associated with the region, so that a selection of the imaging region is performed on the protocol editing screen.

Figure 6:
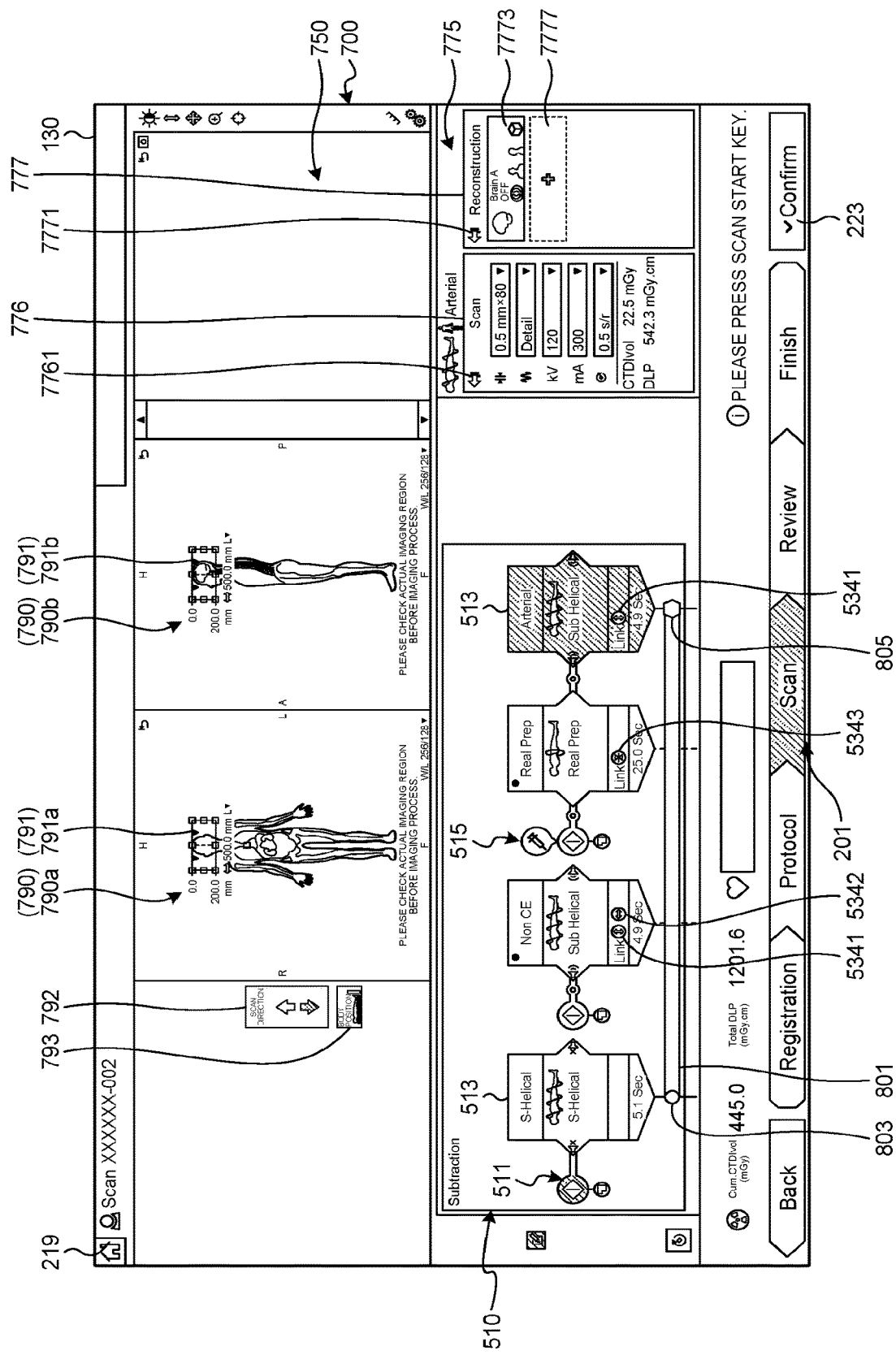
FIG. 6 is a diagram illustrating one example (5) of a scan execution screen that is displayed on the display according to the embodiment.

FIG. 6 is a diagram illustrating one example (5) of the scan execution screen 130 that is displayed on the display 42 according to the embodiment.

As one example, by operating a "Next" button, or the like on the protocol editing screen described above, the operator is able to allow the screen to be transitioned to the scan execution screen 130 while maintaining the display of the protocol display area 500. At this time, the processing circuit 44 reads information, such as a scan condition, that is to be displayed in the scan information display area 700 on the basis of the operation input that has been received from the operator via the input interface 43. After that, the processing circuit 44 displays the scan execution screen 130, and allows the screen to be transitioned from the protocol editing screen.

On the scan execution screen 130, the processing circuit 44 displays, as illustrated in FIG. 6, the protocol display area 500 that has been used to set the protocol on the protocol editing screen that is the display screen displayed in the previous protocol selection phase. In other words, the plurality of scan icons 513 that are displayed in the protocol display area 500 of the scan execution screen 130 indicates a plurality of scans to be performed on the subject P.

Furthermore, similarly to the protocol generation screen 170 illustrated in FIG. 5, the processing circuit 44 displays the scan information display area 700 that includes the imaging information display area 750 and the detailed condition display area 775. In addition, the processing circuit 44 displays, for example, on the scan execution screen 130, a portion of "Scan" that indicates a phase of scan execution in the flow of the examination that is being conducted is displayed as highlighted as compared to the other portions. On the scan execution screen 130, an edited protocol is displayed, a detailed condition for an assigned scan included in the protocol is displayed, and, in addition, it is also possible to check the image obtained by the scan.

Furthermore, on the scan execution screen 130, the processing circuit 44 performs control of causing the plurality of scans to be performed, in the scanning range that has been set as described above, indicated by the plurality of scan icons 513 that are displayed on the protocol display area 500. In other words, in the control method of the CT scan according to the embodiment, the processing circuit 44 performs control of causing the plurality of scans included in the imaging protocol to be performed in the scanning range that has been set as described above.

Furthermore, in the tab in which the information 777 on the reconstruction condition is displayed, in response to an operation of a reconstruction execution icon 779 in which "Reconstruction" is displayed, the processing circuit 44 performs an image reconstruction on the basis of the scan data obtained by the selected scan. In other words, in the control method of the CT scan according to the embodiment, the processing circuit 44 performs control of reconstructing the image on the basis of the scan data (data on the subject to be examined) obtained from each of the plurality of scans that are included in the imaging protocol with respect to the subject P in the reconstruction range that has been set as described above.

(Reference Time Setting Function)

In the following, the reference time setting function included in the X-ray CT apparatus 1 will be described. In a case where a plurality of scan processes are sequentially performed at the time of user operation for an X-ray exposure as a trigger (for example, a button input instruction performed one time), the reference time setting function is a function of arbitrarily setting and changing, by using the GUI, the reference time that is used as a reference of the start timing (start time) of each of the scan processes that are performed the second and the subsequent times. With this function, it is possible to perform each of the arbitrary scan processes that are included in the scan sequence at an intended timing.

Here, "scan sequence (imaging sequence)" means a process that performs the plurality of scan processes corresponding to the plurality of respective imaging techniques that are performed at the time of the user operation for the X-ray exposure as a trigger. Furthermore, the term "reference time" means the time that acts as a reference to determine the start timing of at least one of the plurality of scan processes that are included in the scan sequence process. In addition, the term "time" means a certain single point on the time axis, and may be a single point on, for example, a relative time axis in the scan sequence, or may be a single point on, for example, an absolute time axis in the scan sequence.

In the following, in a case where the plurality of scan processes corresponding to the respective imaging techniques that are included in the scan sequence are sequentially performed by using the reference time setting function, a case in which the reference time related to at least one of the scan processes that are performed the second and the subsequent times from among the plurality of scan processes will be described.

Figure 7:
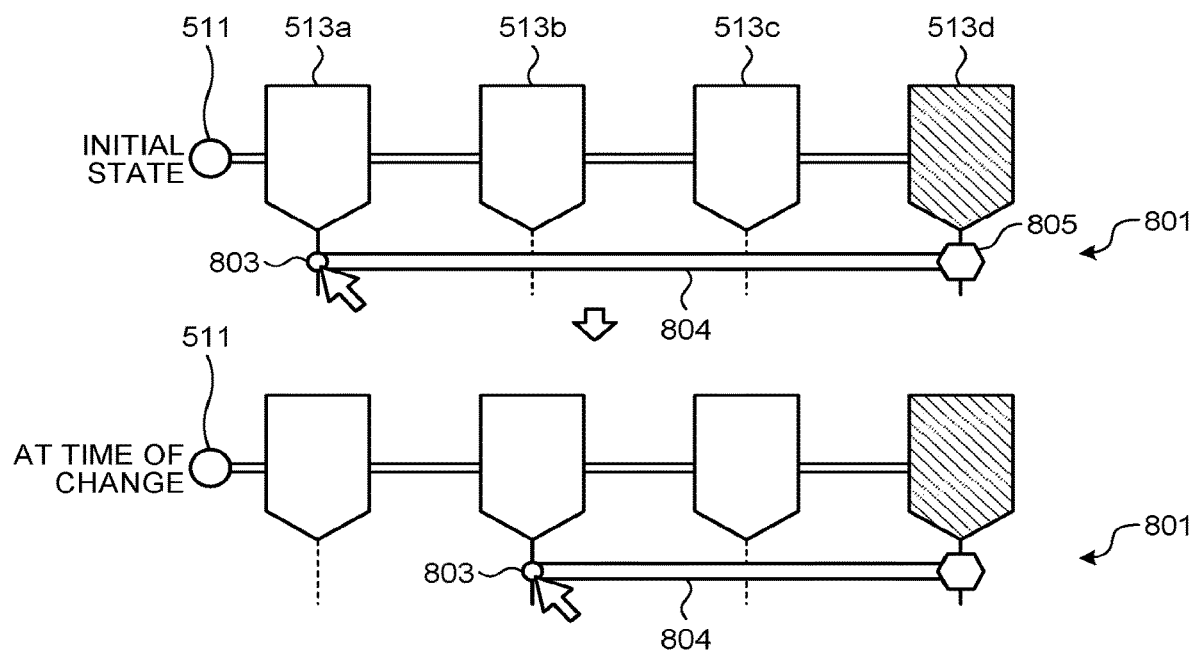
FIG. 7 is a diagram illustrating one example (1) illustrating a screen (a reference time setting screen) that is related to a reference time setting function and that is displayed on the display according to the embodiment.

FIG. 7 is a diagram illustrating one example (1) of a screen (reference time setting screen) that is related to the reference time setting function and that is displayed on the display according to the embodiment. For example, on the protocol generation screen 170 illustrated in FIG. 3 to FIG. 5, on the scan execution screen 130 illustrated in FIG. 6, and on the above described protocol editing screen that is the operation screen for selecting, editing, and adjusting the protocol that is used for the examination, the processing circuit 44 displays the screen illustrated in FIG. 7 on the display in response to a predetermined operation by activating the reference time setting function and transitioning to the reference time setting mode.

As illustrated in FIG. 7, on the reference time setting screen, scan icons 513a, 513b, 513c, and 513d, a user operation icon 511, and a setting icon 801 are displayed. In the setting icon 801, a reference time icon 803, a time bar 804, and a setting target icon 805.

The scan icons 513a, 513b, 513c, and 513d are sequentially arranged along the time axis (in the example illustrated in FIG. 7, in the direction along a line extending from the left to the right on the screen) in the order in which the scan processes corresponding to the independent and respective imaging techniques are performed. In FIG. 7, to give a general explanation, an example of the imaging techniques corresponding to the respective scan icons 513a, 513b, 513c, and 513d; however, for example, in a case of an example of association with FIG. 6, the scan icon 513a is associated with "S-Helical", the scan icon 513b is associated with "Non CE", the scan icon 513c is associated with "Real Prep", and the scan icon 513d is associated with "Arterial". Furthermore, the scan icon 513d is highlighted by the diagonal lines (indicated by an active display), which indicates the scan process corresponding to the scan icon 513d is targeted for the reference time setting. Hereinafter, the scan process targeted for the reference time setting is also simply referred to as a "target scan process".

The user operation icon 511 symbolically indicates the user operation for the X-ray exposure on the time axis. The setting target icon 805 is displayed at the position corresponding to the scan icon of the target scan process on the time axis. The reference time icon 803 is displayed, on the time axis, at the position corresponding to the reference time that is used as a reference for the start timing of the target scan process. The time bar 804 is a line segment that connects the reference time icon 803 and the setting target icon 805 along the time axis, and the length of the time bar 804 corresponds to the length of the countdown time between the reference time icon 803 and the start timing of the target scan process.

The upper diagram illustrated in FIG. 7 illustrates a case as an example in which, as the initial state, the start timing of the target scan process corresponding to the scan icon 513d uses the start timing (or the end timing, etc.) of the scan process corresponding to the scan icon 513a as a reference time. It is assumed a case in which the start timing of the target scan process corresponding to, for example, the scan icon 513d is changed from the state of the above described initial setting to the start timing of the scan process corresponding to the scan icon 513b.

In such a case, as indicated in the lower diagram illustrated in FIG. 7, the reference time icon 803 is clicked, and is moved to a position corresponding to the scan icon 513b on the time axis by a drag operation. The processing circuit 44 resets the imaging parameter in response to a move operation performed on the reference time icon 803 described above, such that the start timing of the target scan process corresponding to the scan icon 513d uses the changed reference time (i.e., the start timing of the scan process of the scan icon 513b) corresponding to the moved position of the reference time icon 803 as a reference.

At this time, the start timing of the target scan process corresponding to the scan icon 513d may be set on the basis of the changed reference time, and which of the timings to be relatively used may be arbitrarily adjusted throughout the overall scan sequence. Furthermore, in a case where it is not possible to secure the countdown time that is used for execution of the target scan process at the changed reference time (for example, in a case where the target scan process to be performed is a process performed by using the imaging technique in which a contrast agent is used and it is not possible to secure sufficient contrast time at the changed reference time), the processing circuit 44 is able to automatically adjust the reference time such that the shortest period of time in which imaging performed by the target scan process is able to be guaranteed corresponds to the countdown time.

Figure 8:
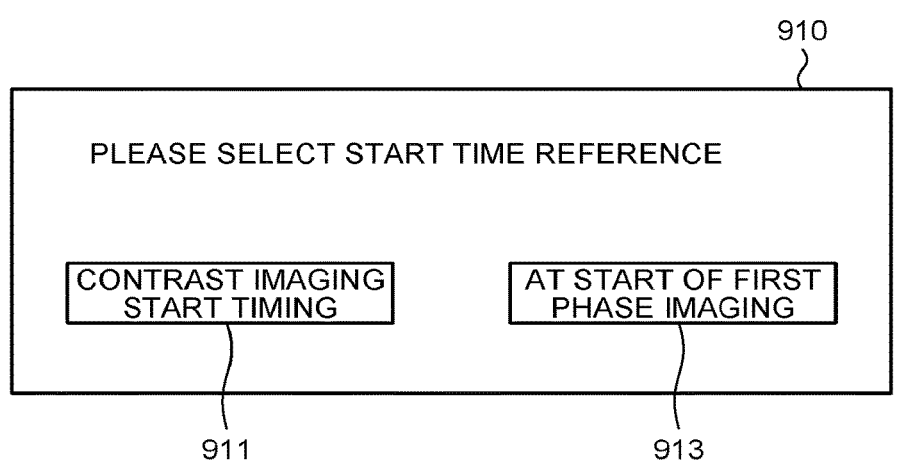
FIG. 8 is a diagram illustrating one example (2) of the reference time setting screen that is displayed on the display according to the embodiment.

FIG. 8 is a diagram illustrating one example (2) of the reference time setting screen that is displayed on the display according to the embodiment. As illustrated in FIG. 8, in a case where the reference time is set by using the reference time setting function, it is also possible to use a setting technique in a dialog format.

In a case where the reference time of the target scan process corresponding to, for example, the scan icon 513d is set, as illustrated in FIG. 8, the timings suitable for the imaging technique of the target scan process, such as a button 911 that corresponds to the contrast imaging start timing that is performed before the target scan process, and a button 913 that corresponds to the start timing of the scan process that corresponds to the scan icon 513a, are displayed in a dialog format. The user is able to set or change the reference time related to the target scan process by clicking the button corresponding to the desired timing. Furthermore, in a case where the button 911 corresponding to the "contrast imaging start timing" has been selected, the reference time icon 803 is displayed by being linked to the subject selection and by being moved to, for example, the lower position of the icon 515 that indicates the contrast agent injection illustrated in FIG. 6 on the time axis.

Figure 9:
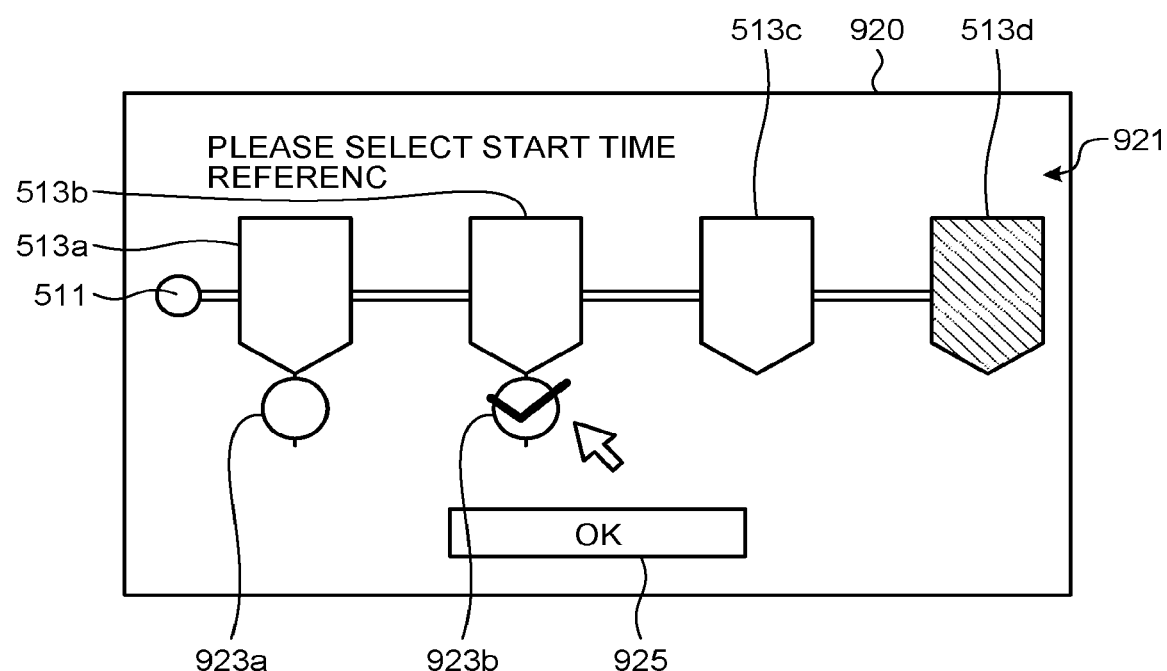
FIG. 9 is a diagram illustrating one example (3) of the reference time setting screen that is displayed on the display according to the embodiment.

FIG. 9 is a diagram illustrating one example (3) of the reference time setting screen that is displayed on the display according to the embodiment. As illustrated in FIG. 9, checkboxes 923a and 923b are displayed, as a window for the dialog format, below the scan icons 513a and 513b, respectively, that correspond to the scan processes that are available to set the reference time together with a message indicating that "Please select the start time reference". The user checks a desired checkbox, and operates an "OK" button, so that the user is able to set the start timing of the corresponding scan process as the reference time. Furthermore, after the operation of the "OK" button, for example, the setting target icon 805 indicated by the lower diagram illustrated in FIG. 7 is displayed.

This type of dialog display may be always displayed at the time of setting of the start timing of the target scan process, or may be displayed after having checked whether or not a contrast imaging is needed and a parameter for the scan type (for example, a contrast imaging monitoring scan), or the like. Furthermore, the timing of the dialog display may be the timing at which the initial setting is performed on the start timing of the target scan process, or the timing at which a decision operation for the condition before the imaging process.

Figure 10:
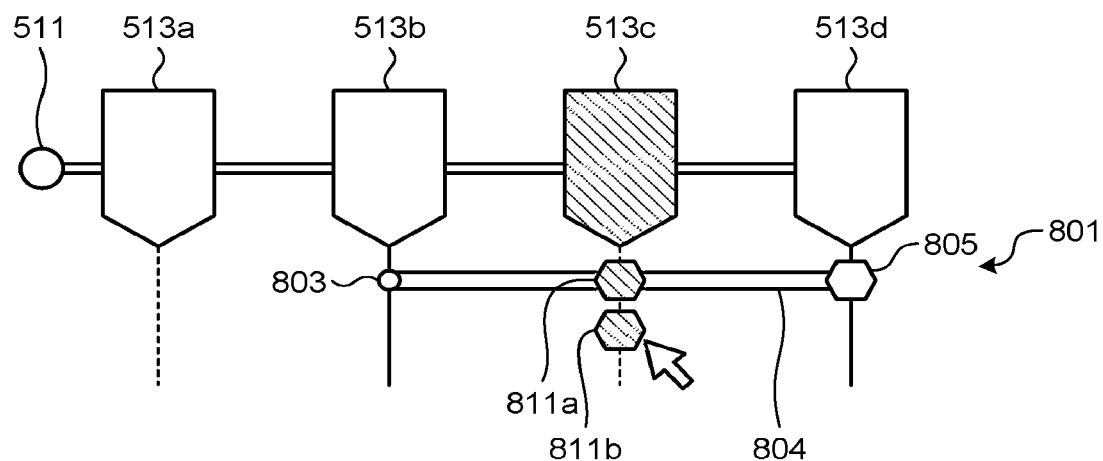
FIG. 10 is a diagram illustrating one example (4) of the reference time setting screen that is displayed on the display according to the embodiment.

FIG. 10 is a diagram illustrating one example (4) of the reference time setting screen that is displayed on the display according to the embodiment. In other words, the one example (4) of the reference time setting screen indicates an example of a case in which the reference time is individually set to each of the plurality of scan processes. Furthermore, FIG. 10 illustrates a case as an example in which the reference time is set for each target scan process by assuming that the target scan process is a scan process corresponding to each of the scan icons 513c and 513d.

As illustrated in FIG. 10, regarding the target scan process corresponding to the scan icon 513d, the start timing of the scan process corresponding to the scan icon 513b is set as the reference time. In this state, when the scan icon 513c is double clicked, setting target icons 811a and 811b are displayed below the scan icon 513c. In addition, the diagonal lines used for each of the setting target icons 811a and 811b indicate a state in which reference time can be set by using each of the setting target icons 811a and 811b.

The setting target icon 811a is used to set the reference time of the target scan process corresponding to the scan icon 513c on a time bar 804a in which the target scan process corresponding to the scan icon 513d has already been set. Furthermore, the setting target icon 811b is used to newly and separately set the reference time of the target scan process corresponding to the scan icon 513c by using the time axis that is different from the time bar 804a that has already been set for the target scan process corresponding to the scan icon 513d.

Figure 11:
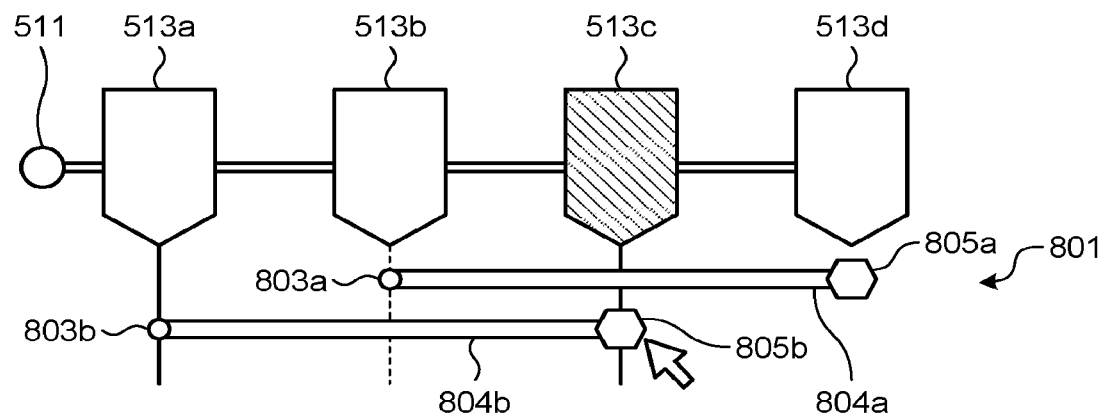
FIG. 11 is a diagram illustrating one example (5) of the reference time setting screen that is displayed on the display according to the embodiment.

FIG. 11 is a diagram illustrating one example (5) of the reference time setting screen that is displayed on the display according to the embodiment. In other words, FIG. 11 indicates one example of the reference time setting screen in a case where the reference time of the target scan process corresponding to the scan icon 513d is set by using a time axis that is different from that of the target scan process corresponding to the scan icon 513d.

As illustrated in FIG. 11, as a result of the user moving a reference time icon 803b to a desired position (in the example illustrated in FIG. 11, the position corresponding to the start timing of the scan icon 513a) on the time axis, the user is able to set the reference time of the target scan process corresponding to the scan icon 513c by using the time axis that is independent of the time axis that is used for the other scan process.

Furthermore, in FIG. 11, in a case where the user has moved the reference time icon 803b to the position corresponding to the start timing of the scan icon 513b, regarding each of the target scan process corresponding to the scan icon 513c and the target scan process corresponding to the scan icon 513d, the setting icons 801 are displayed in parallel. Furthermore, in a case where a plurality of time axes are present, it may be possible to display, as a display method, the time axes in the setting order or in the start order of the scans.

Figure 12:
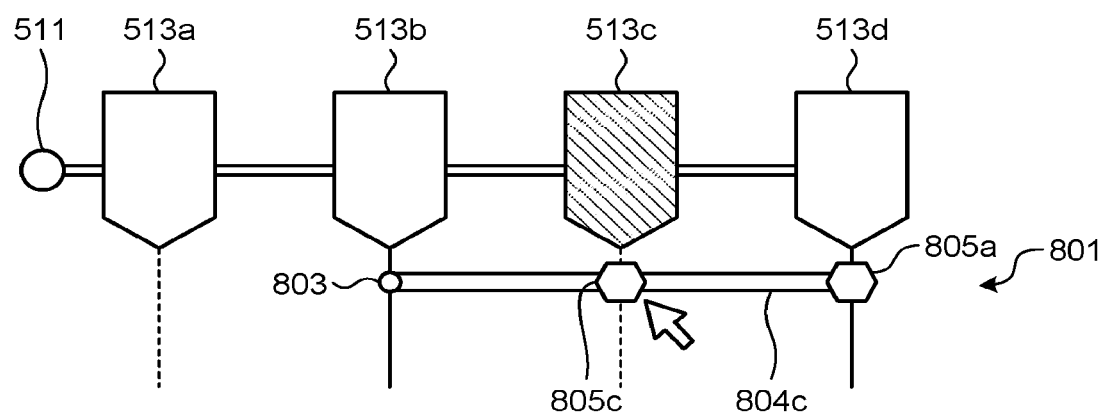
FIG. 12 is a diagram illustrating one example (6) of the reference time setting screen that is displayed on the display according to the embodiment.

FIG. 12 is a diagram illustrating one example (6) of the reference time setting screen that is displayed on the display according to the embodiment. In other words, FIG. 12 indicates one example of the reference time setting screen in a case where the reference time of the target scan process corresponding to the scan icon 513d is set by using the same time axis as that used for the target scan process corresponding to the scan icon 513d.

In other words, FIG. 12 illustrates as an example of a case in which the reference time icon 803 that indicates the reference time of the target scan process corresponding to the scan icon 513c and the reference time icon 803b that indicates the reference time of the target scan process corresponding to the scan icon 513d are integrated as a single time axis. For example, by clicking the reference time icon 803 in a state in which, for example, the setting target icon 811a is active, the user is able to set the reference time of the target scan process corresponding to the scan icon 513c as the same reference time of the target scan process corresponding to the scan icon 513d.

By the way, for example, there may be a case in which, although the reference time of the target scan process has been set, the scan process used to set the subject reference time has already been performed and thus control of the start timing using the reference time that has been set for the target scan process is not able to be guaranteed. Furthermore, there may be a case in which the imaging sequence is interrupted between the scan process and the scan process during, for example, execution of the imaging sequence including the plurality of scan processes from the viewpoint of a guarantee of safety of a patient. In such a case, if the scan process used to set the reference time of the target scan process has already been performed before the interruption, the countdown time between the reference time and the start timing of the target scan process is changed by an amount of the interrupted period of time, and thus, there may be a case in which it is not able to guarantee control of the target scan process performed at the desired start timing.

As described above, in a case where it is not possible to guarantee the control of the target scan process at the start timing using the reference time that has been set once before, a message screen, a dialog screen, or the like for prompting the user to set (re-setup) the reference time again while maintaining the set reference time is output. At the time of the re-setup, the user is able to delete the reference time that has been set once before, and is able to set new reference time using the scan process that has already been performed at the present time or the scan process that will be performed from now, and the like.

Figure 13:
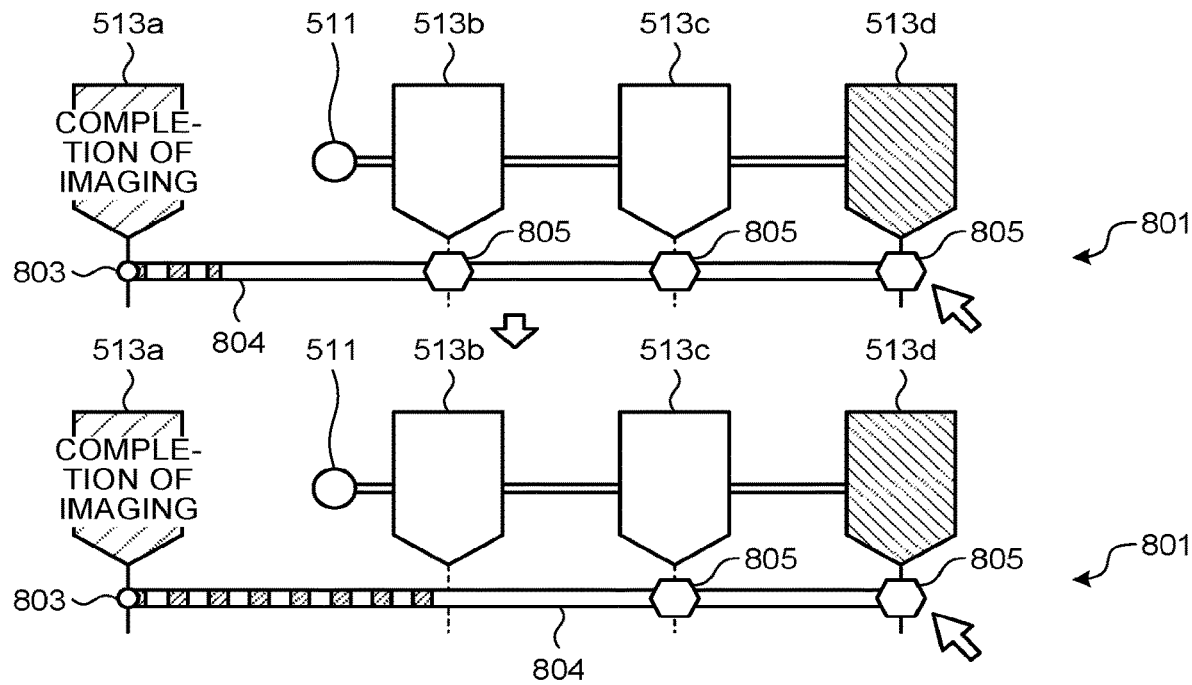
FIG. 13 is a diagram illustrating one example (7) of the reference time setting screen that is displayed on the display according to the embodiment.
Figure 14:
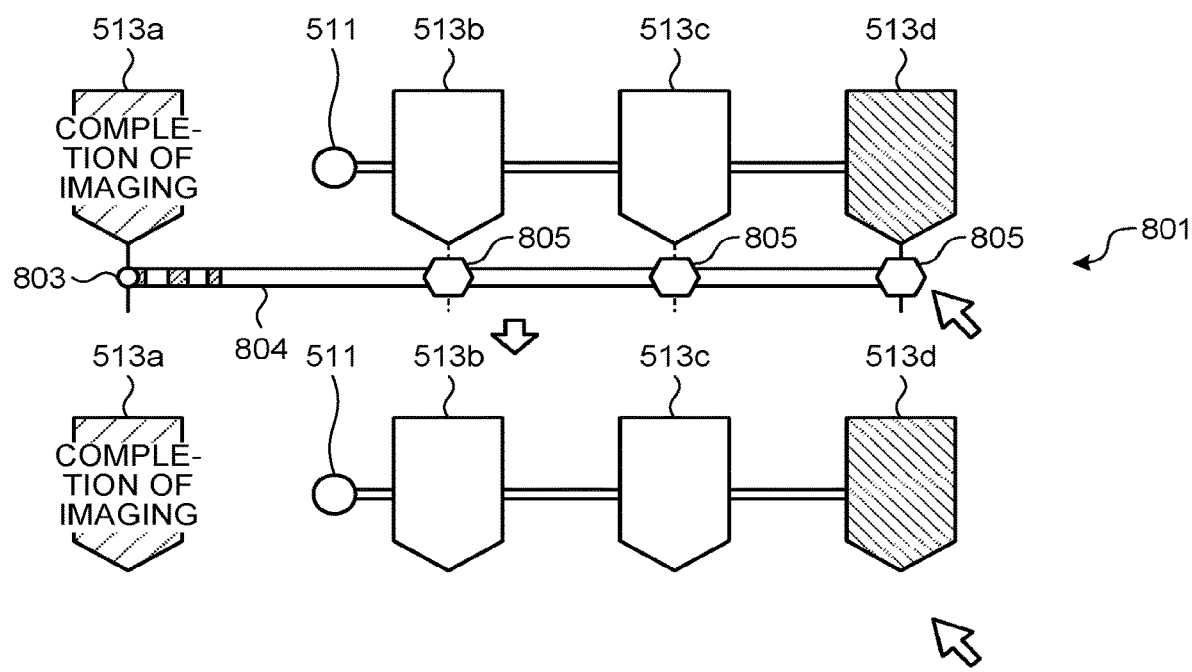
FIG. 14 is a diagram illustrating one example (8) of the reference time setting screen that is displayed on the display according to the embodiment.

FIG. 13 is a diagram illustrating one example (7) of the reference time setting screen that is displayed on the display according to embodiment. FIG. 14 is a diagram illustrating one example (8) of the reference time setting screen that is displayed on the display according to the embodiment. In other words, FIG. 13 and FIG. 14 each indicate one example of the reference time setting screen in a case where it is not possible to correctly guarantee control of the target scan process performed at the start timing using the reference time that has been set once before.

For example, if a re-setup is performed, the imaging sequence is continuously performed on the basis of the newly set reference time. Furthermore, as illustrated in FIG.

13 and FIG. 14, time is also elapsed in a waiting state of the re-setup, information indicating an elapse of time is displayed on the time axis in order to visually identify the state indicating whether the original set time is able to be guaranteed. In addition, FIG. 13 and FIG. 14 each exemplify diagonal lines moving along the time axis direction in accordance with an elapse of time on the time bar 804 as information that indicates an elapse of time. The user is able to visually recognize the remaining countdown time by the diagonally shaded area that progresses together with an elapse of time on the time bar 804.

Furthermore, in a case where it is not possible to correctly control the target scan process at the start timing using the reference time that has been set once before, the setting target icon corresponding to the scan icon that is not able to be guaranteed is automatically deleted. FIG. 13 indicates an example in which the setting target icon 805 that has been associated with the scan icon 513b is automatically deleted in a case of the scan process corresponding to the scan icon 513b that is unable to be guaranteed.

Furthermore, in a case where it is not possible to correctly control the target scan process at the start timing using the reference time that has been set once before, as illustrated in FIG. 14, the setting icon 801 may be automatically deleted from the screen.

In addition, in a case where sequence is again performed from a step of imaging including a start reference position, it is possible to perform a setup by deleting the relationship with the previous sequence, and using the initial setting in which the originally set relationship is maintained. Maintaining the start time may be automatically performed, or a dialog screen for a check may be displayed.

By the way, there may be a case in which a new scan process needs to be added after the end of the imaging sequence. In such a case, it is also possible to continuously set the time axis in the imaging sequence that is performed immediately before.

Figure 15:
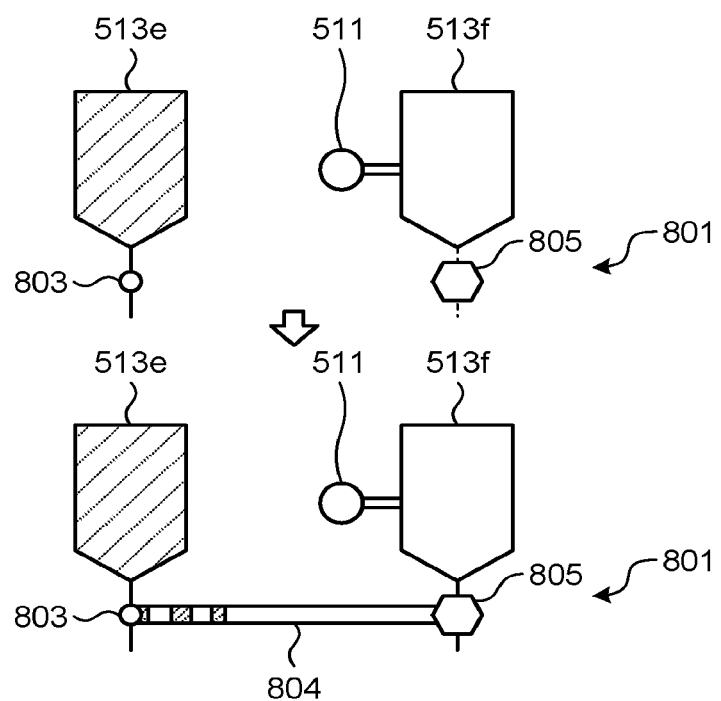
FIG. 15 is a diagram illustrating one example (9) of the reference time setting screen that is displayed on the display according to the embodiment.

FIG. 15 is a diagram illustrating one example (9) of the reference time setting screen that is displayed on the display according to the embodiment. As illustrated in FIG. 15, a scan icon 513f corresponding to a new scan process is added to a latter part of the scan icon 513e corresponding to the last scan in the imaging sequence that is performed immediately before. Furthermore, the imaging sequence including the scan icon 513e has already been completed, the user operation icon 511 that indicates a start (or, an instruction) if a new scan process corresponding to the added scan icon 513f is displayed.

In the state indicated by the upper diagram illustrated in FIG. 15, by assigning the reference time icon 803 that is displayed below the scan icon 513e by performing a click operation, a drag operation, and the like, it is possible to set the reference time of a new scan process corresponding to the scan icon 513f as indicated by the lower diagram illustrated in FIG. 15. Alternatively, as described above, it is possible to set the reference time icon at the desired position on the time axis by performing a click operation, a drag operation, and the like on the reference time icon that is displayed as the initial setting.

Furthermore, setting of the reference time is able to be set in a case where the countdown time becomes longer than the total time of the time needed for an addition and a setup of the elapsed time after the end of the imaging sequence. If it is not possible to ensure the desired countdown time before the completion of an additional setup, it may be possible to release the reference time setting mode in order to immediately perform the new scan process corresponding to a scan icon 413f that has been added.

Figure 16:
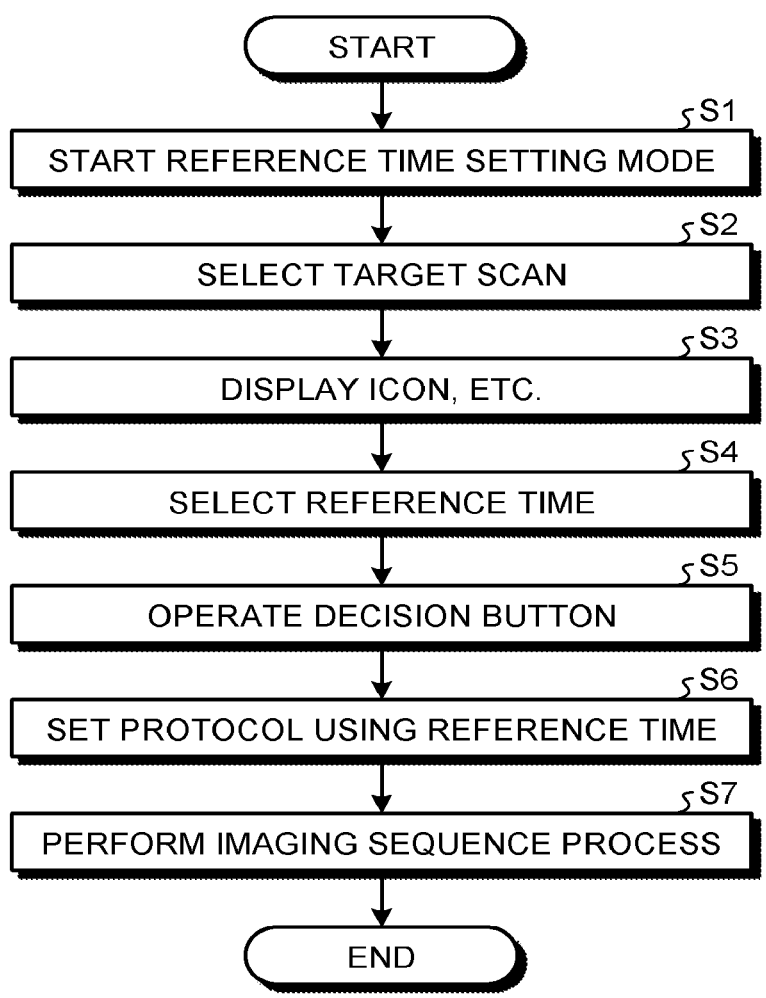
FIG. 16 is a flowchart illustrating the flow of a process including a process of setting reference time according to the embodiment.

FIG. 16 is a flowchart illustrating the flow of a process including setting of the reference time according to the embodiment. As illustrated in FIG. 16, first, the processing circuit 44 receives a start instruction to start the reference time setting mode that has been input from the input interface 43 (Step S1). In response to the start instruction to start the reference time setting mode, the processing circuit 44 causes the display 42 to display the reference time setting screen (for example, the screen or the like illustrated in FIG. 7) as the initial setting.

The processing circuit 44 receives a selection instruction to select the target scan process that has been input from the input interface 43 (Step S2).

In response to the selection instruction to select the target scan process, the processing circuit 44 displays the scan icon corresponding to the target scan process as an active display (for example, highlighting) on the reference time setting screen (Step S3).

The processing circuit 44 receives a selection instruction (i.e., a move instruction to move the reference time icon 803 on the time axis) to select the reference time that has been received from the input interface 43 (Step S4).

The processing circuit 44 receives a decision button operation of the reference time that has been input from the input interface 43 (Step S5). As a result of the decision button operation being received, setting of the reference time related to the target scan process has been completed.

The processing circuit 44 updates the imaging condition and the like by using the set reference time, and sets the imaging protocol (Step S6).

The processing circuit 44 performs imaging sequence (scan sequence) by using the imaging protocol (Step S7).

The X-ray CT apparatus 1 according to the embodiment described above includes the display control function 48 of the processing circuit 44 serving as a setting unit, and the system control function 45 of the processing circuit 44 serving as a control unit. In a case where a plurality of scan processes corresponding to respective and independent imaging techniques are sequentially performed, the display control function 48 sets the reference time that acts as a reference for the start timing of at least one of the second and subsequent scan processes from among the plurality of scan processes. The system control function 45 uses the reference time that has been set by the display control function 48, and sequentially performs the plurality of scan processes in response to the instruction received from the user. Furthermore, the display control function 48 is also able to set independent reference time for each scan process related to at least one of the second and subsequent scan processes.

According to the configuration described above, in a case where the imaging sequence is performed by sequentially performing the plurality of scan processes, it is possible to arbitrarily and independently set the start timing for each scan process. As a result, it is possible to perform an arbitrary scan process included in the imaging protocol at an intended timing. Furthermore, it is possible to perform the scan process at the intended timing, so that it is possible to implement image diagnosis that is flexible and that has a high degree of freedom. In addition, it is possible to reduce a psychological load exerted on a user (operator) while guaranteeing patient safety.

The display control function 48 sets the reference time by using a timing of the scan process that is performed before at least one of the second and subsequent scan processes.

According to the configuration described above, regarding the target scan process, it is possible to set the reference time by using the relationship with the timing of the scan process that is performed at the previous stage. As a result, it is possible to provide the X-ray CT apparatus 1 that is convenient for the user.

The display control function 48 sets the reference time by using a timing of the process performed by using a contrast agent before at least one of the second and subsequent scan processes.

According to the configuration described above, regarding the target scan process, it is possible to set the start timing by using, for example, a contrast agent injection timing as the reference time. Therefore, it is possible to perform the target scan process at a further accurate and appropriate timing. As a result, it is possible to contribute to providing higher quality medical care, and, furthermore, it is possible to provide the X-ray CT apparatus 1 that is convenient for the user.

In a case where the reference time has been set, the display control function 48 sets new reference time in response to a change instruction to change the set reference time.

According to the configuration described above, it is possible to newly set the reference time again that has been set once before in accordance with the circumstances. As a result, it is possible to provide the X-ray CT apparatus 1 that is convenient for the user.

The display control function 48 sets the reference time with respect to a position of the first icon indicating the timing, at which at least one of the second and subsequent scan processes is performed, by using a GUI for changing the position along the time axis of the second icon that indicates the reference time.

According to the configuration described above, it is possible to intuitively and easily set the reference time by using the visual GUI. In particular, by using visual information, it is possible to determine whether a return is available when imaging is being interrupted, so that it is possible to reduce a possibility of a re-examination, such as a contrast imaging injection.

The display control function 48 sets the reference time in response to an instruction that is input by the user via a dialog display.

According to the configuration described above, it is possible to intuitively and easily set the reference time by using the visual GUI. As a result, it is possible to provide the X-ray CT apparatus 1 that is convenient for the user.

The display control function 48 sets the reference time in response to an instruction that is input by the user at the time of generating a protocol for sequentially performing the plurality of scan processes or at the time of editing the protocol. Furthermore, the display control function 48 sets, during sequential execution of the plurality of scan processes, the reference time in response to an instruction that is input by the user.

According to the configuration described above, it is possible to set the reference time of the target scan process at an arbitrary timing, such as at the time of generating the protocol, at the time of editing the protocol, and during sequential execution of imaging sequence. As a result, it is possible to implement image diagnosis that is flexible and that has a high degree of freedom. Furthermore, with the X-ray CT apparatus 1 that is easy to use, it is possible to reduce a work load of the user (operator), and it is thus possible to reduce psychological load exerted on the user.

The display control function 48 sets the reference time, during sequential execution of the plurality of scan processes, by using the timing of the scan process that has already been performed from among the plurality of scan processes. Furthermore, in a case where the plurality of scan processes has been interrupted, the display control function 48 sets the reference time by using the timing of one of the scan processes that has been performed before the interruption from among the plurality of scan processes.

According to the configuration described above, it is possible to implement image diagnosis that is flexible and that has a high degree of freedom.

In a case where the display control function 48 is not able to sequentially perform the plurality of scan processes by using the set reference time, the display control function 48 releases the set reference time.

According to the configuration described above, after a release of the set reference time, it is possible to visually check the target scan process indicating that control of the start timing using the set reference time is not able to be performed. As a result, there is no need to perform a setting release process, and thus, it is possible to reduce a work load of the user. Furthermore, the set reference time is automatically released and then returns to the initial state, so that it is possible to perform the imaging sequence without interruption.

(Modification 1)

In a case where a new scan process is added during execution of imaging sequence, a new scan process need not always be added to the end of the imaging sequence. In other words, it is possible to insert a new scan process into a midstream of the imaging sequence, and, regarding the scan process that has been newly inserted in this way, it is also possible to set the reference time by using the reference time setting function and individually set the start timing.

(Modification 2)

In the embodiment described above, the start timing, the end timing, and the like of the scan process that is performed before the target scan process have been described as a typical example of the reference time. The reference time is not limited to this example. For example, it may be possible to use a heart rate number or a heart phase of a patient in a scan process that is performed before the target scan process, and also, it may be possible to use a predetermined user operation (a predetermined button operation, a voice instruction, etc.) to be performed in the scan process that is performed before the target scan process.

The term "processor" used in the above description indicates, for example, a circuit, such as a CPU, a GPU, an ASIC, and a programmable logic device (PLD). The PLD includes a simple programmable logic device (SPLD), a complex programmable logic device (CPLD), and a field programmable gate array (FPGA). The processor implements the functions by reading and executing the programs stored in the storage circuit. The storage circuit in which the programs are stored is a non-transitory computer readable recording medium. Furthermore, instead of storing the programs in the storage circuit, the programs may be directly incorporated in the circuit of the processor. In this case, the processor implements the functions by reading and executing the programs incorporated in the circuit. Furthermore, instead of executing the program, it may be possible to implement the functions corresponding to the program by using a combination of a logical circuit. Furthermore, each of the processors according to the present embodiment need not always be configured as a single circuit for each processor. It may be possible to configure the processors as a single processor by combining a plurality of independent circuits, and implement the functions thereof. Furthermore, it is also possible to integrate the plurality of components illustrated in FIG. 1 into a single processor and implements the functions thereof.

According to at least one of the embodiments described above, it is possible to perform an arbitrary scan process from among a plurality of scan processes included in the imaging sequence at an intended timing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Regarding the embodiments described above, following notes are disclosed as one aspect of the invention and selective characteristics thereof.

(Supplementary Note 1)
A medical image diagnostic apparatus including:
a setting unit that sets, in a case where a plurality of scan processes corresponding to respective and independent imaging techniques are sequentially performed, reference time that acts as a reference for a start timing of at least one of second and subsequent scan processes from among the plurality of scan processes, and
a control unit that uses the reference time that has been set by the setting unit, and that sequentially performs the plurality of scan processes in response to an instruction received from a user.

(Supplementary Note 2)
The setting unit may set the reference time by using a timing of the scan process that is performed before at least one of the second and subsequent scan processes.

(Supplementary Note 3)
The setting unit may set the reference time by using a timing of a process that is performed by using a contrast agent before at least one of the second and subsequent scan processes.

(Supplementary Note 4)
The setting unit may set, in a case where the reference time has been set, new reference time in response to a change instruction with respect to the set reference time.

(Supplementary Note 5)
The setting unit may set the reference time with respect to a position of a first icon that indicates a timing, at which at least one of the second and subsequent scan processes is performed, by using a GUI for changing a position along a time axis of a second icon that indicates the reference time.

(Supplementary Note 6)
The setting unit may set the reference time in response to an instruction that is input by the user via a dialog display.

(Supplementary Note 7)
The setting unit may set, at a time of generating a protocol for sequentially performing the plurality of scan processes or at a time of editing the protocol, the reference time in response to an instruction that is input by the user.

(Supplementary Note 8)
The setting unit may set, during sequential execution of the plurality of scan processes, the reference time in response to an instruction that is input by the user.

(Supplementary Note 9)
The setting unit may set, during sequential execution of the plurality of scan processes, the reference time by using a timing of a scan process that has already been performed from among the plurality of scan processes.

(Supplementary Note 10)
The setting unit may independently set the reference time for each of the scan processes related to at least one of the second and subsequent scan processes.

(Supplementary Note 11)
The setting unit may release the set reference time in a case where the plurality of scan processes are not able to be sequentially performed by using the set reference time.

(Supplementary Note 12)
The setting unit may set, in a case where the plurality of scan processes is interrupted, the reference time by using a timing of one of the scan processes that has been performed before the interruption from among the plurality of scan processes.

(Supplementary Note 13)
A medical image diagnostic system including:
a setting unit that sets, in a case where in a case where a plurality of scan processes corresponding to respective and independent imaging techniques are sequentially performed, reference time that acts as a reference for a start timing of at least one of second and subsequent scan processes from among the plurality of scan processes, and
a control unit that uses the reference time that has been set by the setting unit, and that sequentially performs the plurality of scan processes in response to an instruction received from a user.

(Supplementary Note 14)
An information processing method of medical image diagnosis including
setting, in a case where a plurality of scan processes corresponding to respective and independent imaging techniques are sequentially performed, reference time that acts as a reference for a start timing of at least one of second and subsequent scan processes from among the plurality of scan processes, and
using the reference time that has been set by the setting unit, and sequentially performing the plurality of scan processes in response to an instruction received from a user.

What is claimed is:

1. A medical image diagnostic apparatus comprising:
at least one processor, wherein
the at least one processor is configured to
set, in a case where a plurality of scan processes corresponding to respective and independent imaging techniques are sequentially performed, reference time that acts as a reference for a start timing of at least one of second and subsequent scan processes from among the plurality of scan processes; and
use the reference time that has been set, and sequentially performs the plurality of scan processes in response to an instruction received from a user.

2. The medical image diagnostic apparatus according to claim 1, wherein the at least one processor sets the reference time by using a timing of the scan process that is performed before at least one of the second and subsequent scan processes.

3. The medical image diagnostic apparatus according to claim 1, wherein the at least one processor sets the reference time by using a timing of a process that is performed by using a contrast agent before at least one of the second and subsequent scan processes.

4. The medical image diagnostic apparatus according to claim 1, wherein the at least one processor sets, in a case where the reference time has been set, new reference time in response to a change instruction with respect to the set reference time.

5. The medical image diagnostic apparatus according to claim 1, wherein the at least one processor sets the reference time with respect to a position of a first icon that indicates a timing, at which at least one of the second and subsequent scan processes is performed, by using a GUI for changing a position along a time axis of a second icon that indicates the reference time.

6. The medical image diagnostic apparatus according to claim 1, wherein the at least one processor sets the reference time in response to an instruction that is input by the user via a dialog display.

7. The medical image diagnostic apparatus according to claim 1, wherein the at least one processor sets, at a time of generating a protocol for sequentially performing the plurality of scan processes or at a time of editing the protocol, the reference time in response to an instruction that is input by the user.

8. The medical image diagnostic apparatus according to claim 1, wherein the at least one processor sets, during sequential execution of the plurality of scan processes, the reference time in response to an instruction that is input by the user.

9. The medical image diagnostic apparatus according to claim 8, wherein the at least one processor sets, during sequential execution of the plurality of scan processes, the reference time by using a timing of a scan process that has already been performed from among the plurality of scan processes.

10. The medical image diagnostic apparatus according to claim 1, wherein the at least one processor independently sets the reference time for each of the scan processes related to at least one of the second and subsequent scan processes.

11. The medical image diagnostic apparatus according to claim 1, wherein the at least one processor releases the set reference time in a case where the at least one processor is not able to sequentially perform the plurality of scan processes by using the set reference time.

12. The medical image diagnostic apparatus according to claim 1, wherein the at least one processor sets, in a case where the plurality of scan processes is interrupted, the reference time by using a timing of one of the scan processes that has been performed before the interruption from among the plurality of scan processes.

13. A medical image diagnostic system comprising:
at least one processor, wherein
the at least one processor is configured to
set, in a case where a plurality of scan processes corresponding to respective and independent imaging techniques are sequentially performed, reference time that acts as a reference for a start timing of at least one of second and subsequent scan processes from among the plurality of scan processes; and
use the reference time that has been set, and sequentially performs the plurality of scan processes in response to an instruction received from a user.

14. An information processing method of medical image diagnosis comprising:
setting, in a case where a plurality of scan processes corresponding to respective and independent imaging techniques are sequentially performed, reference time that acts as a reference for a start timing of at least one of second and subsequent scan processes from among the plurality of scan processes, and
using the reference time that has been set in the setting unit, and sequentially performing the plurality of scan processes in response to an instruction received from a user.

* * * * *